United States Patent
Sutou

(10) Patent No.: US 7,702,769 B2
(45) Date of Patent: Apr. 20, 2010

(54) DATA TRANSFER METHOD, APPARATUS, AND RECORDING MEDIUM FOR USE IN HIERARCHICAL SYSTEM

(75) Inventor: Hiromi Sutou, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/066,281

(22) Filed: Feb. 28, 2005

(65) Prior Publication Data

US 2005/0154791 A1 Jul. 14, 2005

Related U.S. Application Data

(63) Continuation of application No. 09/492,079, filed on Jan. 27, 2000, now abandoned.

(30) Foreign Application Priority Data

Jan. 27, 1999 (JP) ................... P11-18011

(51) Int. Cl.
 G06F 15/16 (2006.01)
 G06F 15/173 (2006.01)
 G06F 13/00 (2006.01)
 G06F 12/00 (2006.01)
(52) U.S. Cl. ................ 709/223; 709/248; 711/122; 711/133; 707/203
(58) Field of Classification Search ................ 709/201, 709/203, 217, 219, 232, 238, 244, 248, 223, 709/205, 213, 216, 245, 251; 707/203, 205, 707/206; 711/122, 159, 133, 130, 134
See application file for complete search history.

(56) References Cited

U.S. PATENT DOCUMENTS

| | | | |
|---|---|---|---|
| 4,638,425 A * | 1/1987 | Hartung ...................... 711/133 |
| 5,408,610 A * | 4/1995 | Arakawa .................... 709/245 |
| 5,655,118 A | 8/1997 | Heindel et al. .......... 707/103 R |
| 5,673,252 A * | 9/1997 | Johnson et al. ............. 370/449 |
| 5,721,914 A * | 2/1998 | DeVries ..................... 709/201 |
| 5,765,155 A | 6/1998 | Nakamura |
| 5,812,773 A | 9/1998 | Norin ........................ 709/204 |
| 5,920,691 A | 7/1999 | Tsutsui et al. ............... 709/201 |
| 5,924,116 A * | 7/1999 | Aggarwal et al. .......... 711/122 |
| 6,047,320 A | 4/2000 | Tezuka et al. .............. 709/223 |
| 6,061,692 A * | 5/2000 | Thomas et al. ............. 707/200 |
| 6,064,971 A | 5/2000 | Hartnett ...................... 706/46 |
| 6,085,193 A * | 7/2000 | Malkin et al. ................ 707/10 |
| 6,161,145 A * | 12/2000 | Bainbridge et al. ......... 709/246 |

(Continued)

FOREIGN PATENT DOCUMENTS

EP 0782080 2/1997

(Continued)

*Primary Examiner*—Ario Etienne
*Assistant Examiner*—Gregory G Todd
(74) *Attorney, Agent, or Firm*—Brundidge & Stanger, P.C.

(57) ABSTRACT

In a hierarchical network configuration, if transfer of data, such as requirements and responses therefrom and thereto, are executed in a relay manner between plural manager systems and managed systems on network routes, the requirements and the responses are duplicated in each manager system, thereby presenting a problem of increased amounts of data transfer on the network. It is possible to prevent the data transfer amounts from increasing not only on one route but also on plural routes by determining whether to update data on the basis of names of a manager system in upper layers, route information and so forth.

9 Claims, 27 Drawing Sheets

U.S. PATENT DOCUMENTS

| | | | |
|---|---|---|---|
| 6,334,156 B1 | 12/2001 | Matsuoka et al. | 709/252 |
| 6,338,117 B1 * | 1/2002 | Challenger et al. | 711/122 |
| 6,360,222 B1 | 3/2002 | Quinn | 707/100 |
| 6,370,618 B1 * | 4/2002 | Arimilli et al. | 711/122 |
| 6,396,845 B1 | 5/2002 | Sugita | 370/449 |
| 6,430,613 B1 | 8/2002 | Brunet et al. | 709/223 |
| 6,516,327 B1 * | 2/2003 | Zondervan et al. | 707/200 |

FOREIGN PATENT DOCUMENTS

| | | |
|---|---|---|
| JP | 1243168 | 9/1989 |
| JP | 08008909 | 1/1996 |
| JP | 830559 | 2/1996 |
| JP | 10308743 | 11/1998 |
| WO | 9812650 | 3/1998 |

* cited by examiner

DATA TRANSFER METHOD, APPARATUS, AND RECORDING MEDIUM FOR USE IN HIERARCHICAL SYSTEM

The present application is a continuation of application Ser. No. 09/492,079, filed Jan. 27, 2000, now abandoned the contents of which are incorporated herein by reference.

BACKGROUND OF THE INVENTION

The present invention relates generally to a data transfer method, a data transfer apparatus, and data recording medium for use in hierarchical systems.

FIG. 1 shows a system in which a managed system returns static information (namely, unique information having little change in result) in response to a requirement by a manager system for information acquisition. To be more specific, an information acquisition requirement by a manager system (101) is sent to a managed system (106) through submanager systems (102 through 105) in a relay manner.

Likewise, a response result to the information acquisition requirement is also returned to the manager system through the submanager systems in a relay manner. At this time, an information acquisition requirement and its response result are not transferred over different routes.

Referring to FIG. 2, each of the submanager systems (202 through 205) is composed of a manager capability and a submanager capability and may issue an information acquisition requirement like the manager system, performing the same information acquisition requirement operation as with the case of the manager system. One example of a system having the above-mentioned characteristics is a system in a hierarchical configuration for acquiring property information on a submanager system from a manager system as shown in FIG. 3.

SUMMARY OF THE INVENTION

If a manager system and submanager systems issue the same information acquisition requirement to a managed system, the same information acquisition requirement and its reply result flow on a route multiple times, causing a redundancy (in the portions in which the arrows of information acquisition requirement and its replay result overlap as shown in FIG. 1), sometimes overloading the network.

In order to solve the above-mentioned problems, the present invention executes the following procedure. If an information acquisition requirement is made from the manager system to a managed system, it is determined in the submanager systems on the routes to that managed system whether or not to issue the same information acquisition requirement.

If the same information acquisition requirement is to be issued, it is recognized in advance in the submanager systems. When the information acquisition requirement was received by the managed system and it has returned a response result, the submanager systems acquire the response result if it is necessary, and pass the response result to the manager system.

This configuration can prevent the same data from flowing over a route in a duplicated, redundant manner. In addition, by having each submanager system store in advance the response results for particular information acquisition requirements, the submanager system can pass the stored result in response to a particular information acquisition requirement to the manager system or a submanager system in an upper layer that issued the requirement. Consequently, this configuration reduces the data traffic on the route from that submanager system to the managed system.

BRIEF DESCRIPTION OF THE DRAWINGS

These and other objects of the invention will be better understood by reference to the following description, taken in connection with the accompanying drawing, in which.

DETAILED DESCRIPTION OF PREFERRED EMBODIMENTS

Figure 1:
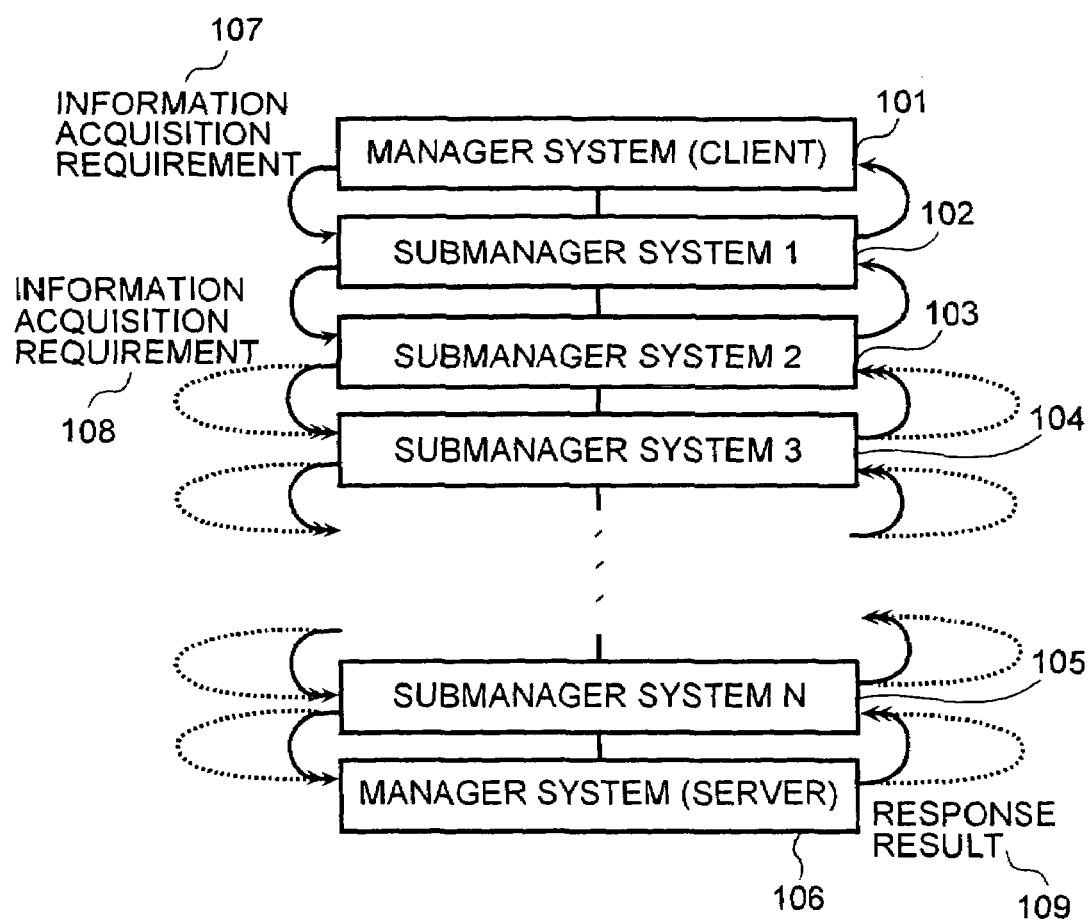
FIG. 1 is a diagram illustrating the configuration of a system to which the present invention is applicable and the flows of data transfer therein.
Figure 2:
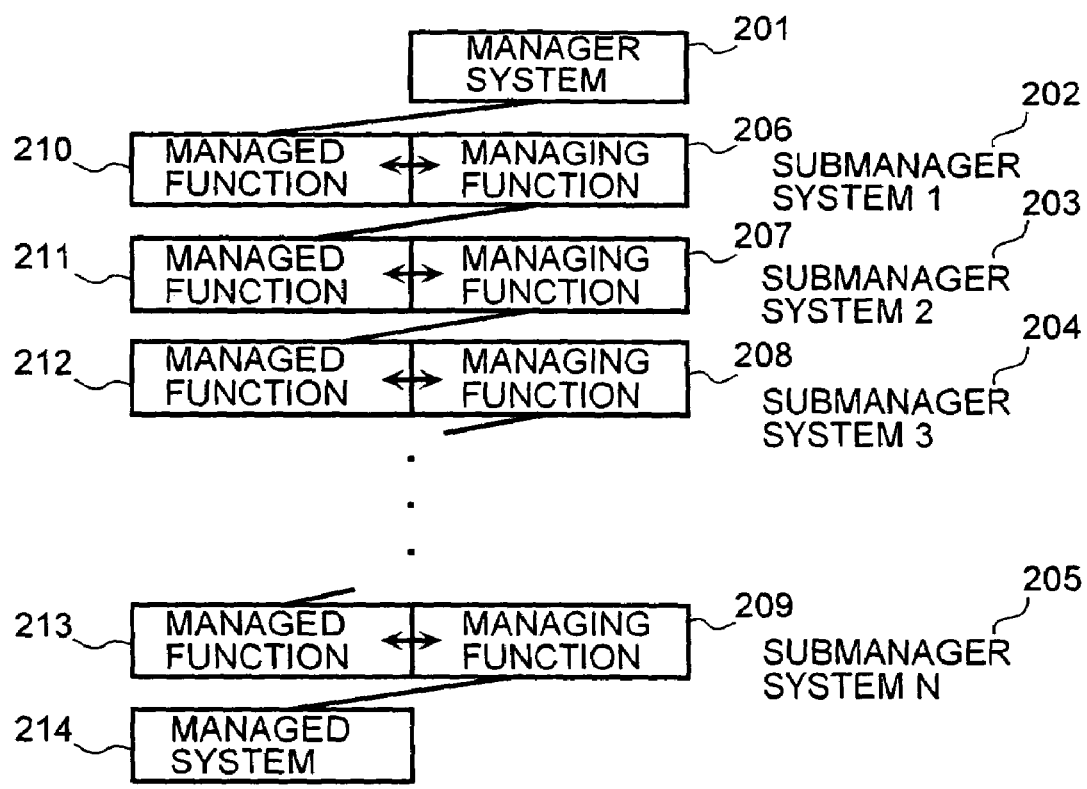
FIG. 2 is a diagram illustrating the configuration of a system of the type to which the present invention is applicable.
Figure 3:
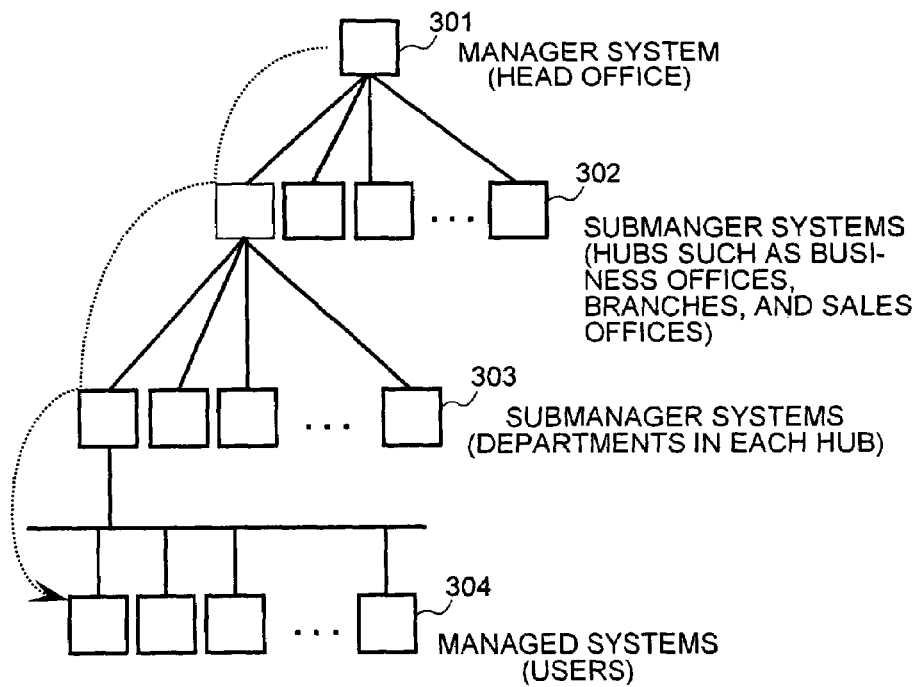
FIG. 3 is a diagram illustrating one example of a system configuration for managing property information in a multi-layer system.

This invention will be described in further detail by way of example with reference to the accompanying drawings. For embodiments of the invention, systems are used, for example, for managing the property information of managed systems in a multilayer network environment as shown in FIG. 3 (although not shown in FIG. 3, business hubs such as business offices, branches, and sales offices and the departments in each of these hubs also have multiple submanager systems and managed systems). It is assumed here that the submanager systems in the multilayer network environment are subordinate to the manager system, and the submanager systems in every layer do not depend on the information about the other submanager systems in that layer. The following description provides an outline of the flow of processing.

Figure 4:
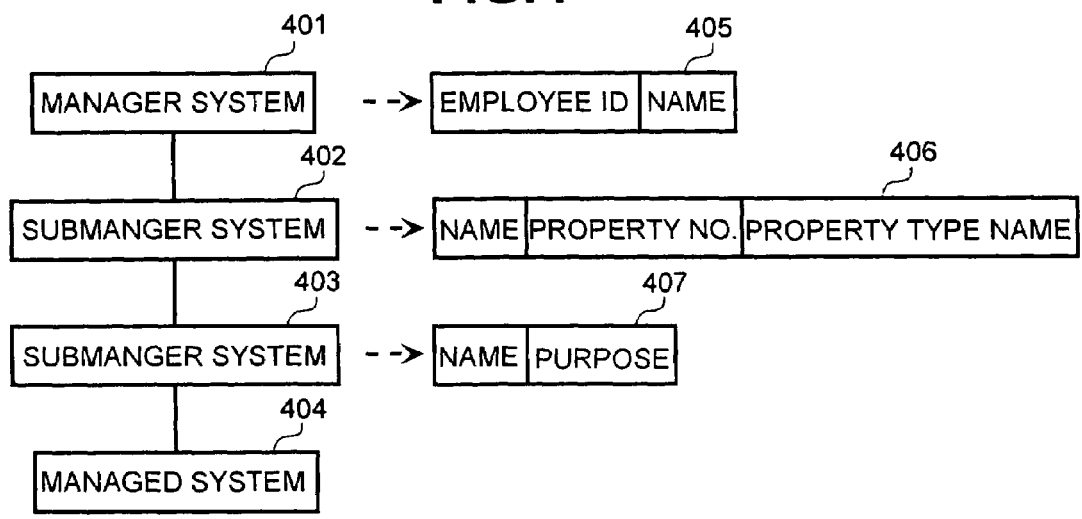
FIG. 4 is a diagram illustrating a state in which each of the manager system and submanager systems has items.
Figure 5:
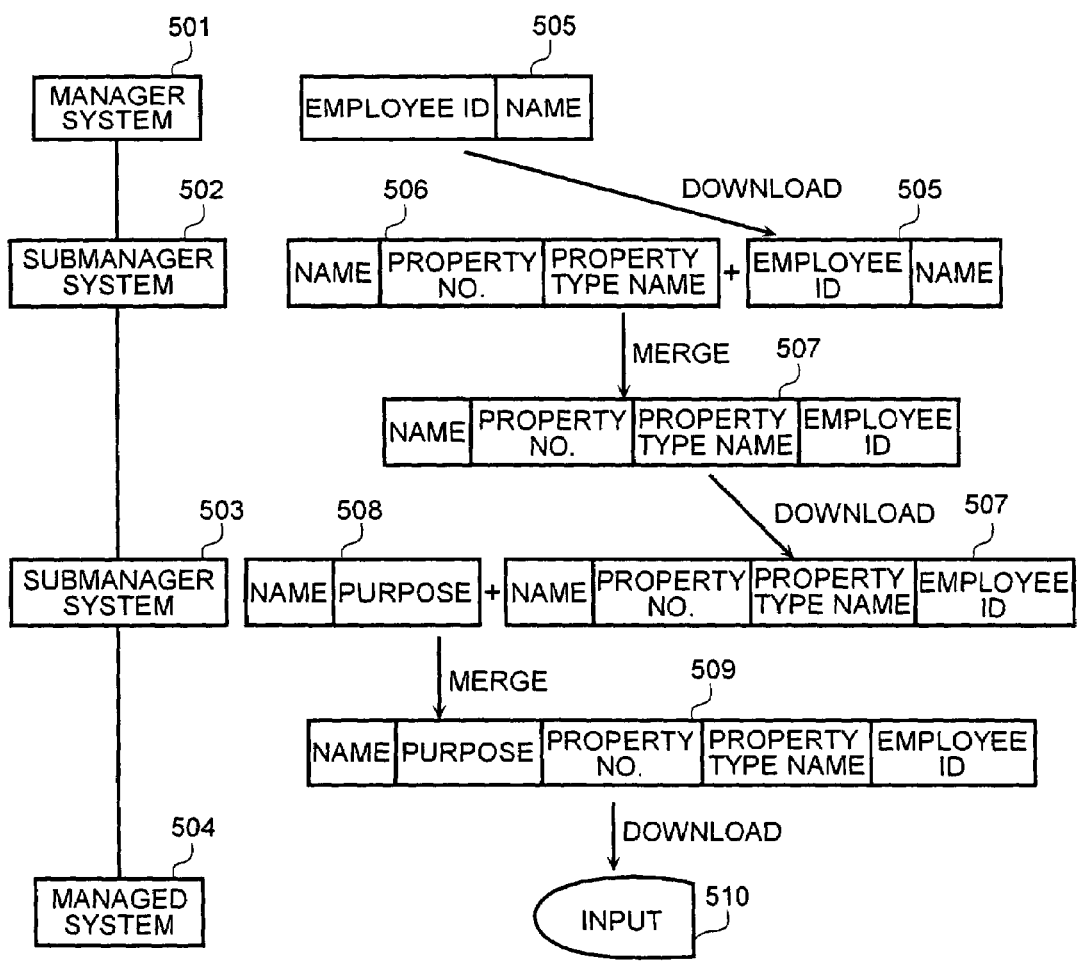
FIG. 5 is a diagram illustrating a method of merging items in each of the manager system and submanager systems.

Now, referring to FIG. 4, the items of information required by the manager system and the submanager systems in every layer are defined. Next, as shown in FIG. 5, the manager system issues an information acquisition requirement, and by repeated merging of the items of required information and downloading item files in the submanager systems, the manager system requires information from the managed system.

Figure 6:
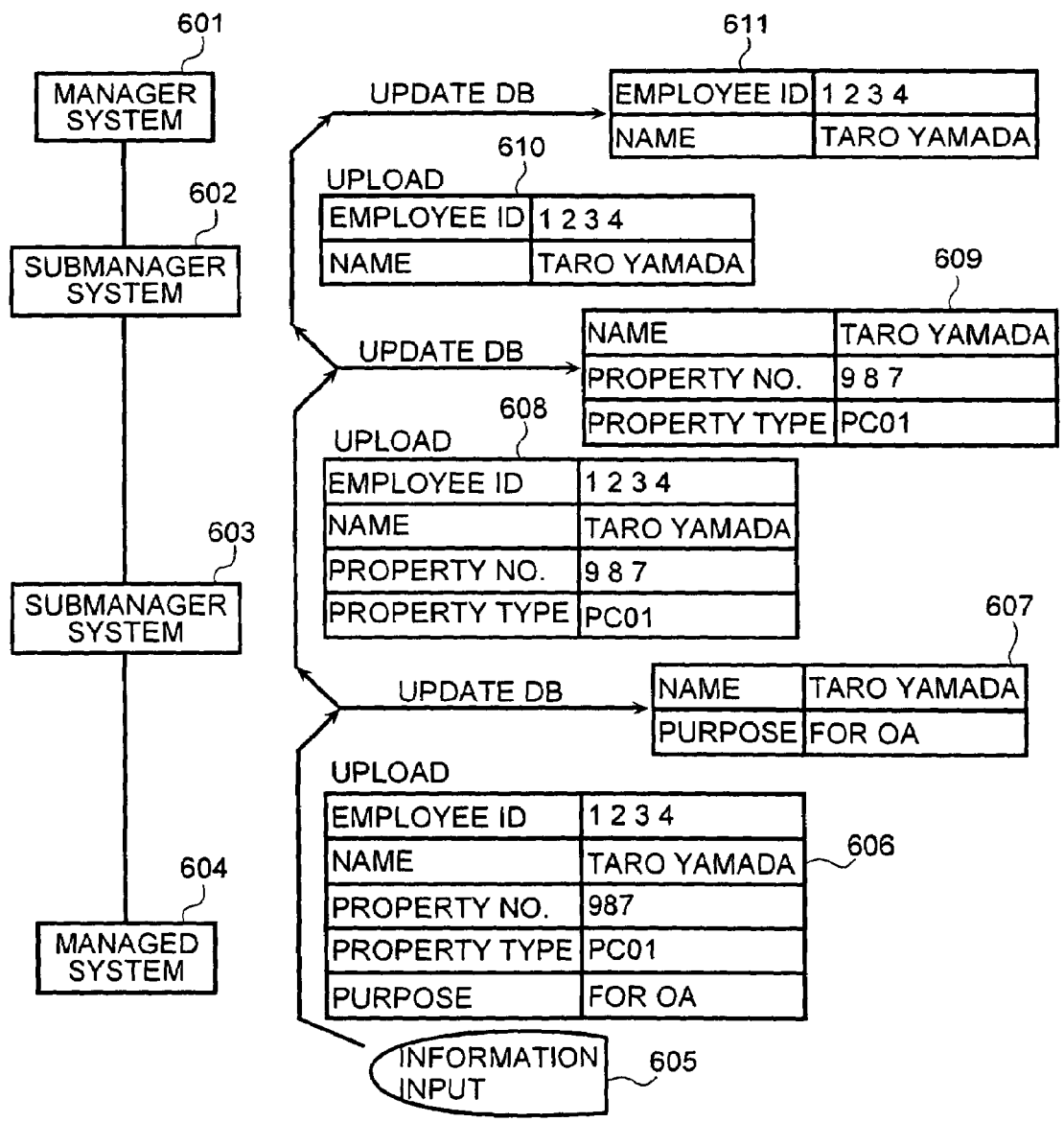
FIG. 6 is a diagram illustrating a method of updating property information in each of the manager system and submanager systems.

Referring to FIG. 6, a file containing the result of property information inputted in the managed system is uploaded into the manager system through the submanager systems. In the course of this uploading, each submanager system updates the information with respect to the items defined by itself and uploads the other items to the upper submanager system.

It should be noted that the embodiments are directed to property information managing systems as described above, but the present invention is also applicable to systems that handle other kinds of information to be required for acquisition.

Embodiment 1

Figure 7:
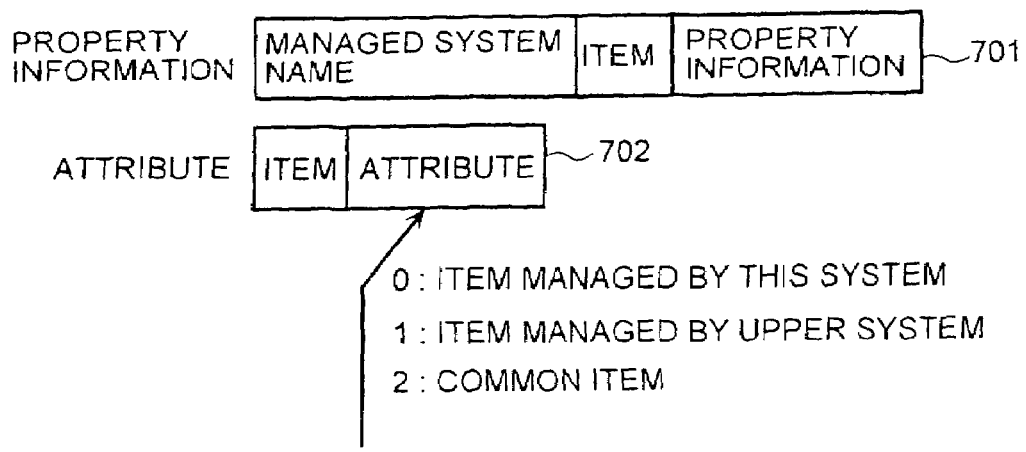
FIG. 7 is a diagram illustrating the structure of a DB having attributes.
Figure 8:
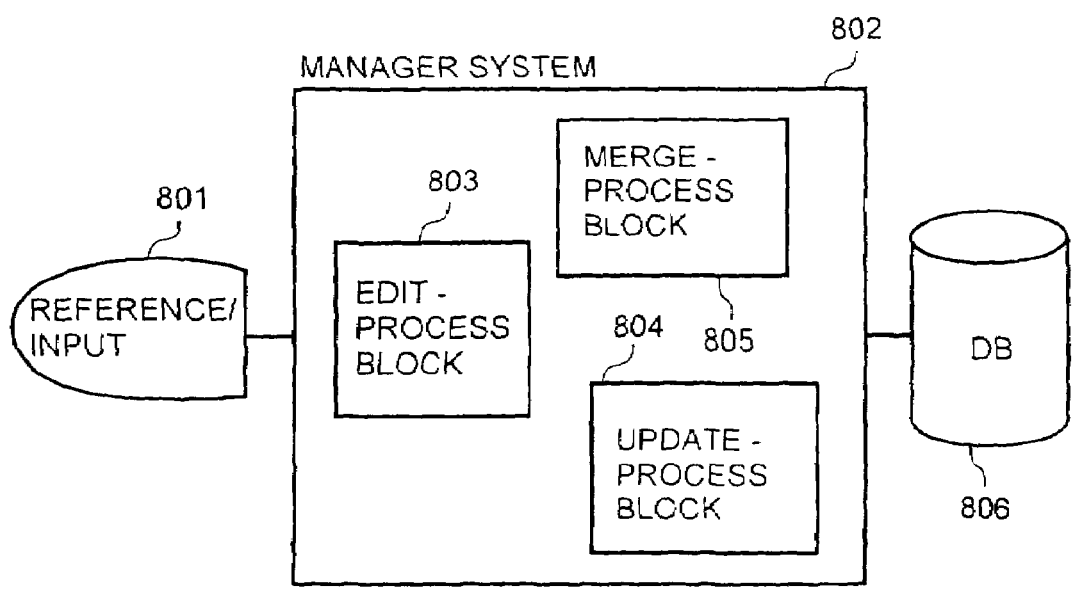
FIG. 8 is a diagram illustrating the configuration of a program in the manager system.

FIG. 8 is a block diagram of the program in each submanager system. The submanager system comprises a main manager program (802), a merge processing block (hereafter referred to as merge-process) (805) that receives an item file composed of item groups downloaded from the upper-layer manager system and merges the received items, an update processing block (hereafter referred to as update-process) (804) that receives a result file composed of the items and property information from the lower-layer system (the lower-layer manager system or the managed system) and updates the property information, an edit processing block (hereafter referred to as edit-process) (803) that edits items managed in its own system, a user terminal (801) on which information display and operations are executed, and a DB (Database) (806) storing the items and property information. The structure of the DB is as shown in FIG. 7 in which each item has an attribute field.

To this attribute field, one of three statuses is set: "0" identifies an item managed by the system in a current layer (hereafter also referred to as "this system") indicative that the item is managed in the layer of this current system; "1" identifies an item managed by an upper system indicative that the item is managed by the upper system; and "2" identifies a common item indicative that this item is common to this system and the upper system. Basically, the submanager system in each layer can be realized by a configuration similar to that of the submanager systems in the other layers. However, the program of the manager system at the top of the multilayer environment has no merge-process. All the processing operations mentioned above can be executed concurrently. In the concurrent processing, there is a time in which DB update-processes overlap. It is assumed that this portion of over-lapped time is exclusively controlled in advance (this, however, is omitted from the description of the processing flow below).

First, the edit-process will be described. In edit-process, the contents of the DB of this system are displayed and edited. For displaying the property information stored in the DB, only items other than those managed by the upper system are displayed.

Figure 9:
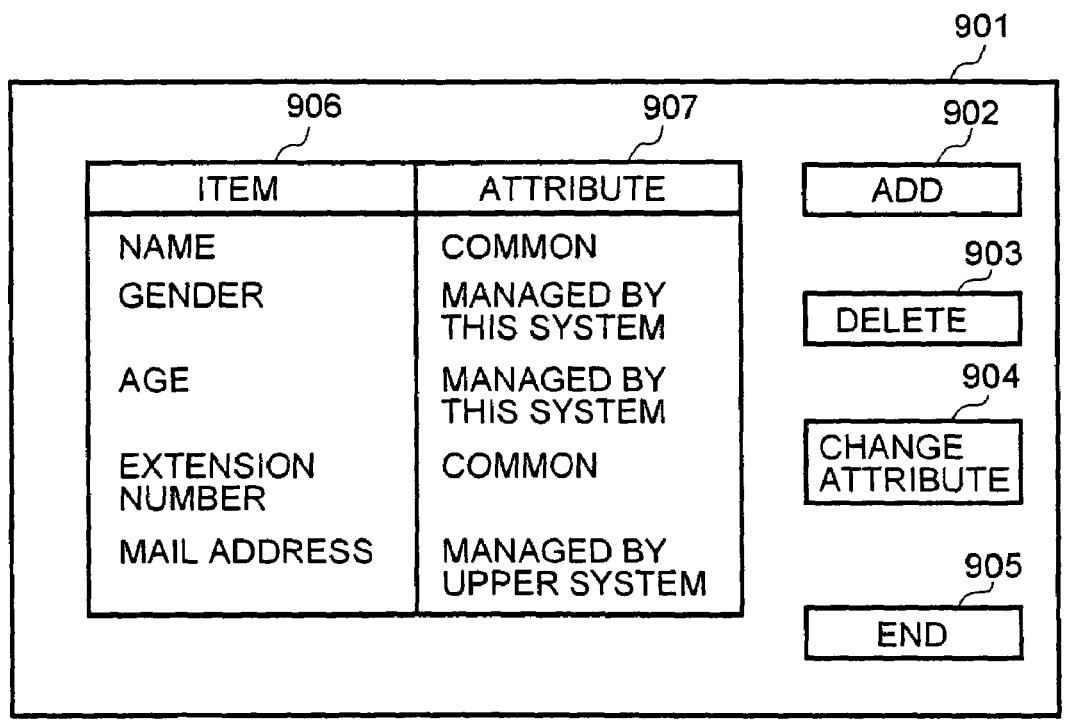
FIG. 9 is a diagram illustrating one example of the item edit screen in the manager system.
Figure 10:
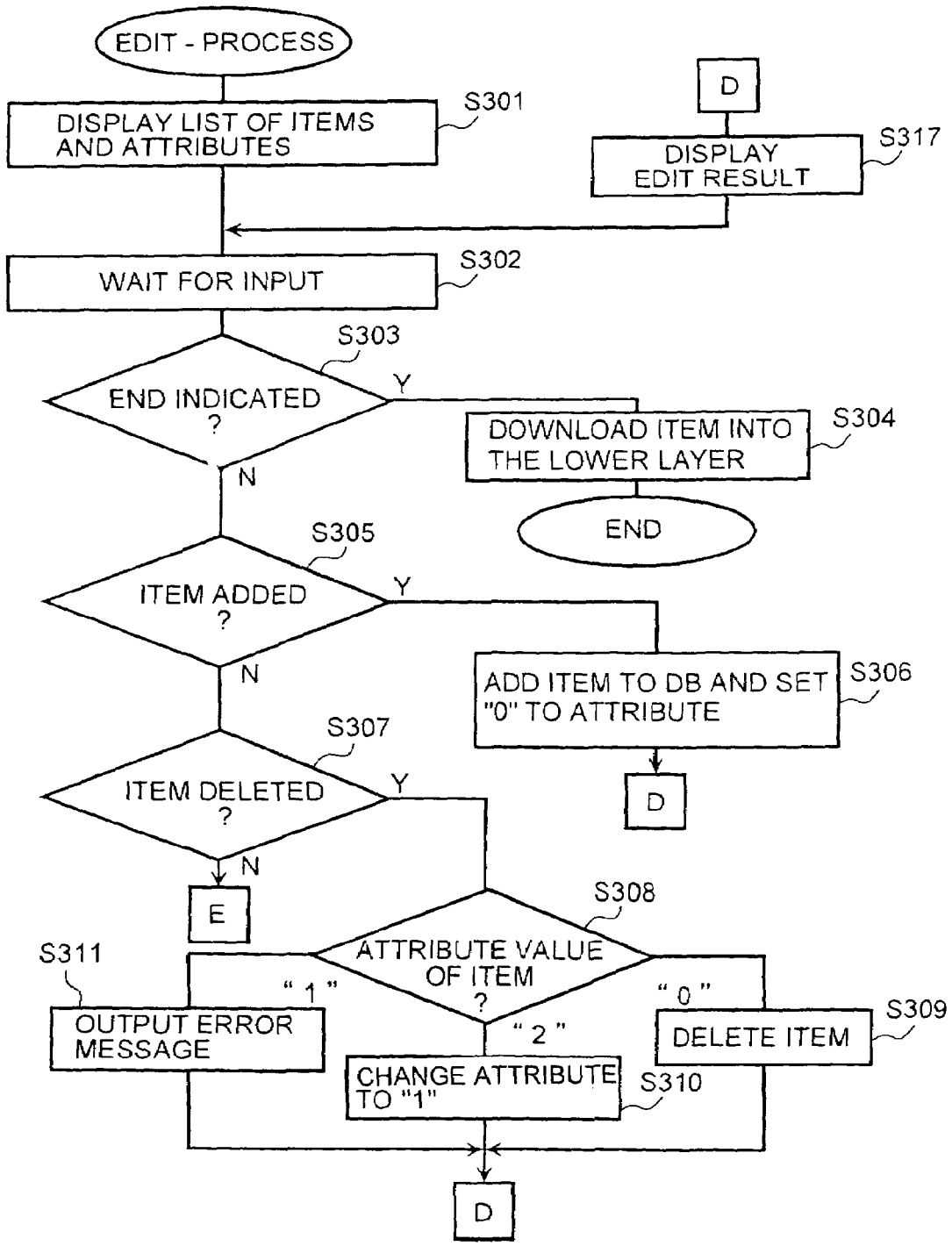
FIG. 10 is a flowchart indicative of item editing.
Figure 11:
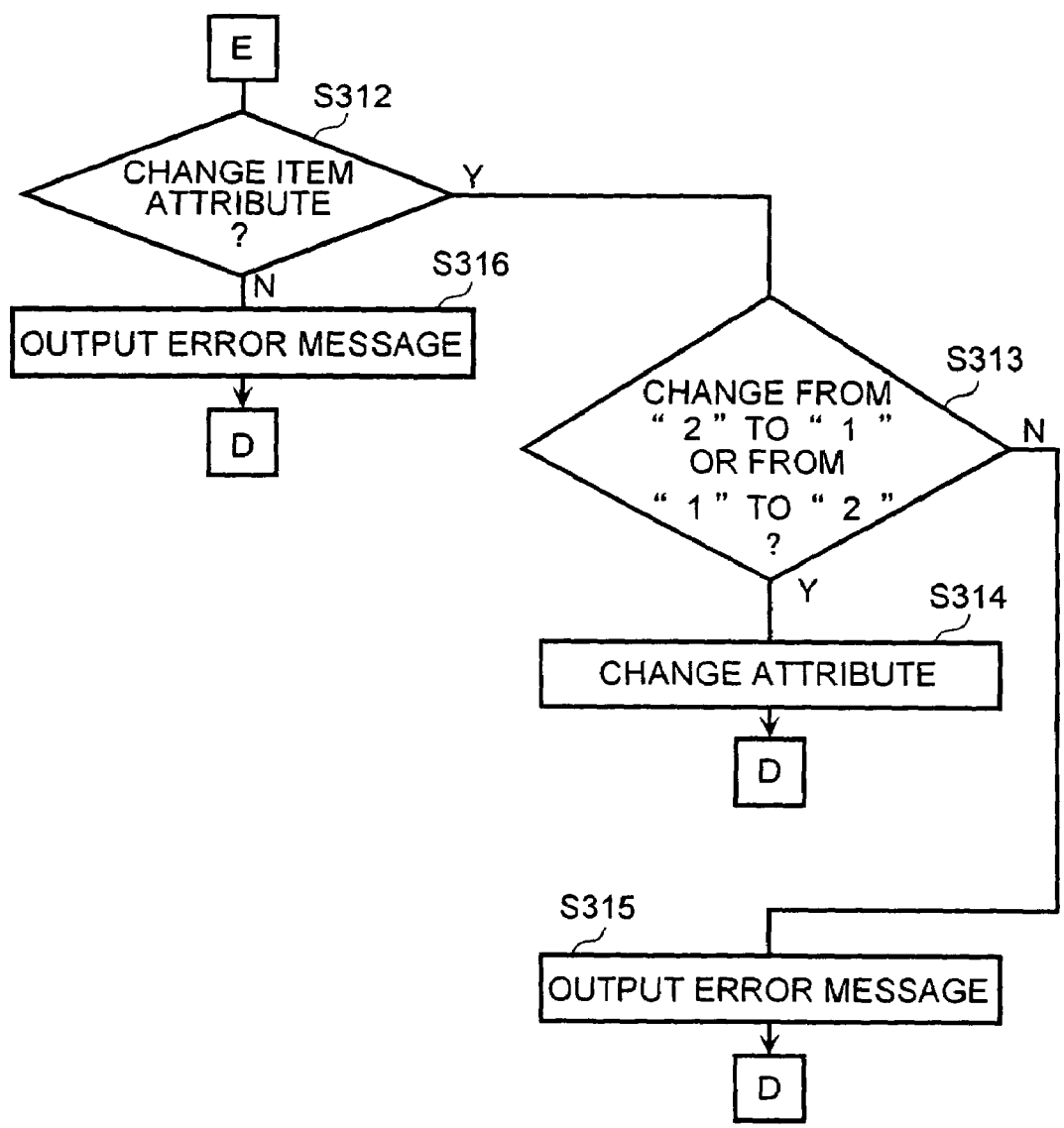
FIG. 11 is a flowchart continued from the flowchart of FIG. 10.

The output of edit-process can also be directed to a file or a printer in a free form in addition to the display device of the user terminal. In edit-process, addition and deletion of items and an attribute change of items can be performed. FIG. 9 shows one example of the edit screen. FIGS. 10 and 11 show flowcharts indicative of the edit operation. A list of items and their attributes are displayed on the display device of the user terminal (S301), and the system will wait for an input operation by the user (S302).

When the edit operation has been completed and the end thereof is instructed by the user (S303), this system extracts the items from the DB of this system and downloads the item file containing the extracted items to the lower submanager system or the managed system directly connected to this system (S304), at which time the editing is ended. If no editing has been performed, the file downloading is not performed. If the addition of an item is instructed (S305), this system adds the specified item to its DB, specifies the attribute of the added item as the item managed by this system ("0") (S306), and waits for another operation to be inputted by the user (S302). If the deletion of an item is instructed (S307), this system deletes the specified item from its DB directly, provided that the attribute of the item to be deleted is the item managed by this system ("0") (the property information is also deleted if it is set for the item) (S309). If the attribute is the item managed by the upper system ("1"), this system outputs an error message (S311). If the attribute is the common item ("2"), this system changes the attributes to the item managed by upper system ("1") (S310).

When the above-mentioned processing has been completed, this system waits for an operation to be inputted by the user (S302). If the change of an item attribute is instructed (S312), the attribute of that item is changed from the item managed by the upper system ("1") to the common item ("2"), or if the instruction is vice versa, the attribute of that item is changed (S314) from the common item ("2") to the item managed by the upper system ("1"), outputs an error message (S315) and waits for an operation to be inputted by the user.

In the case of other instructions than those stated above, this system outputs an error message (S316) and waits for an operation to be inputted by the user (S302). It is practicable to determine particular button operations that will cause an error and deactivate the buttons concerned in advance to prevent the user from operating them.

Figure 12:
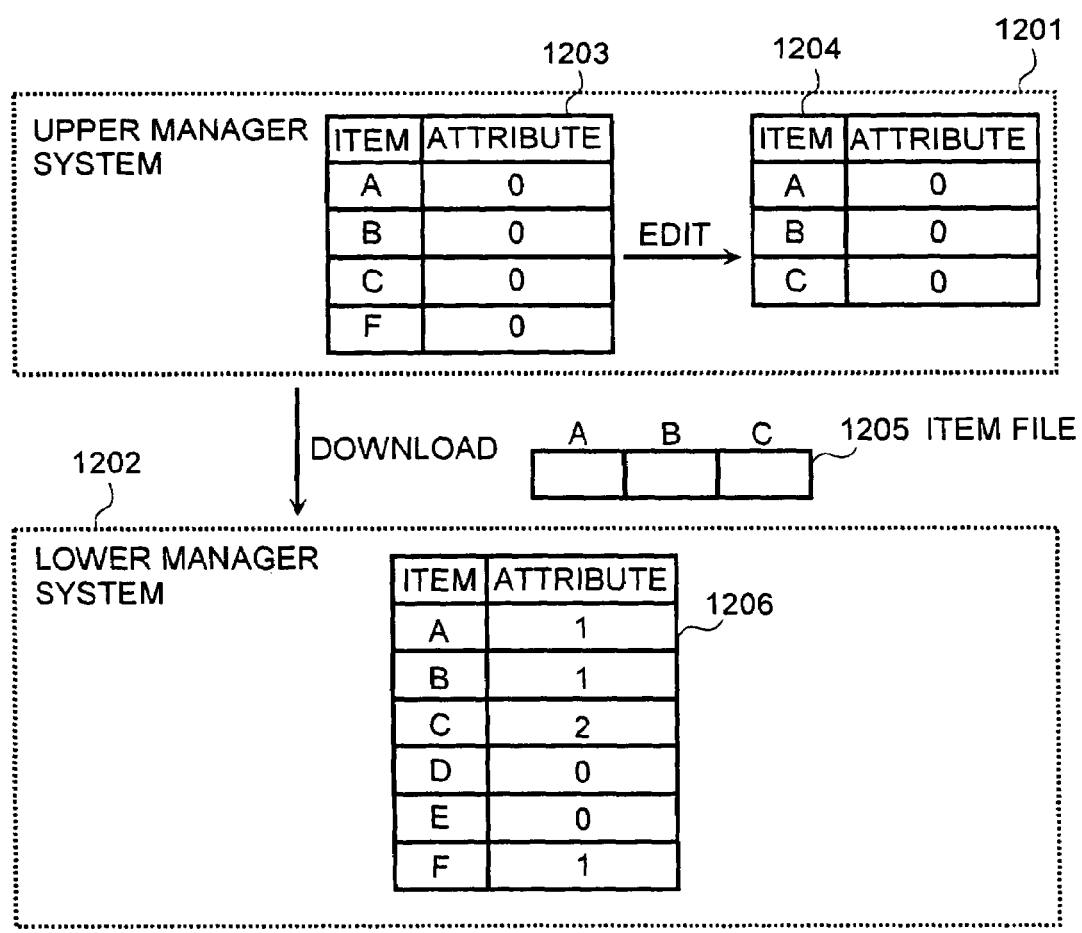
FIG. 12 is a diagram illustrating the initial state of items of each of the manager system and submanager systems.
Figure 13:
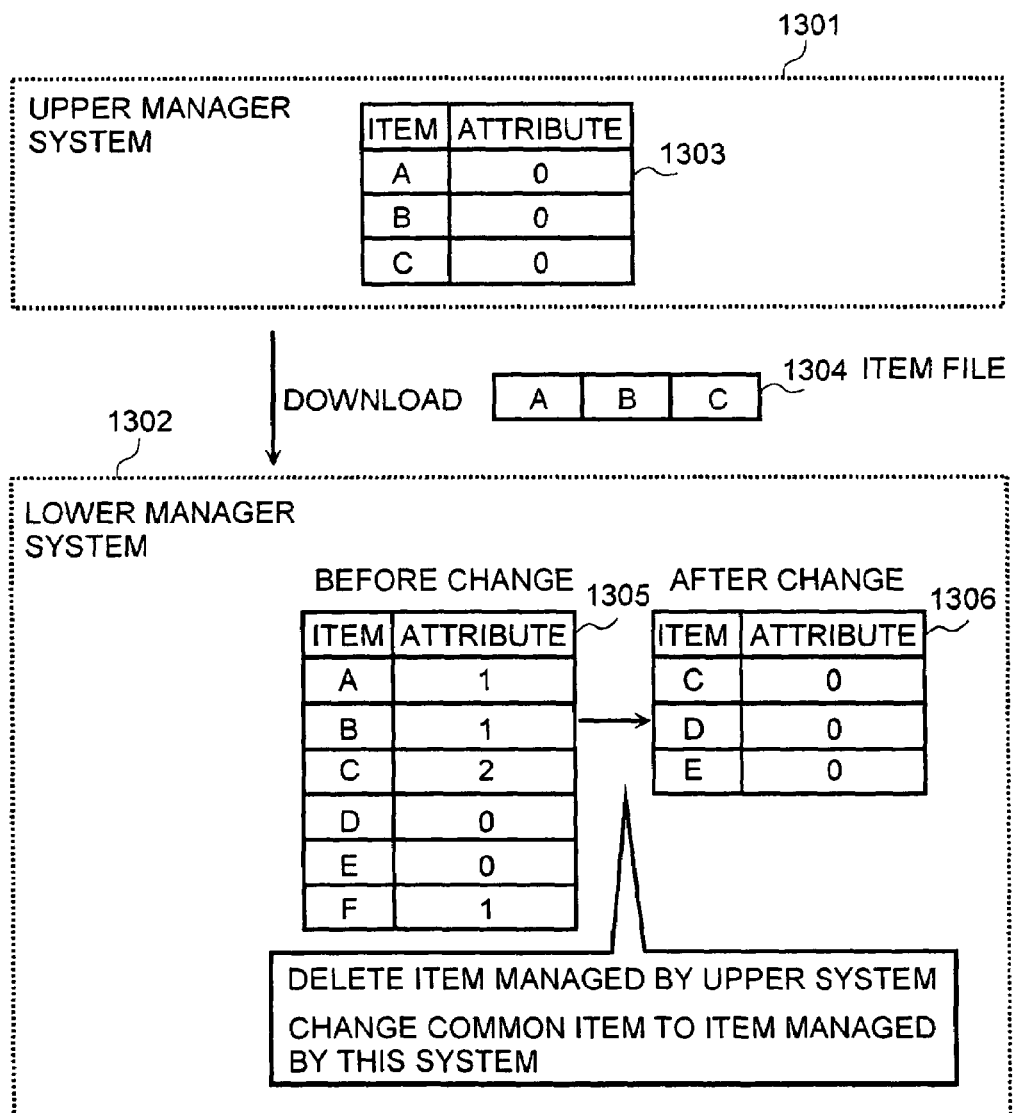
FIG. 13 is a diagram illustrating a state in which items are initialized.
Figure 14:
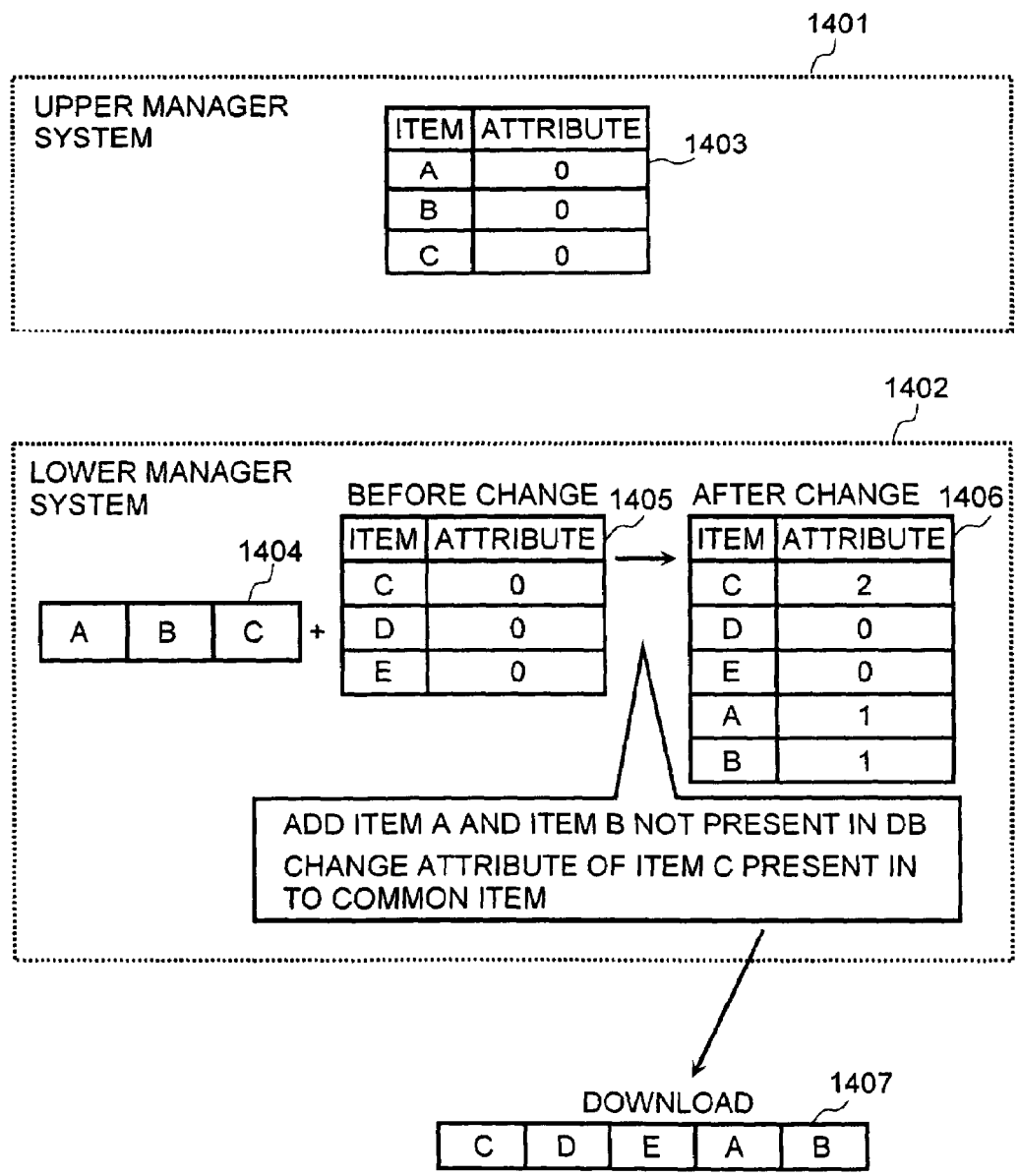
FIG. 14 is a diagram illustrating a state in which items are merged.
Figure 15:
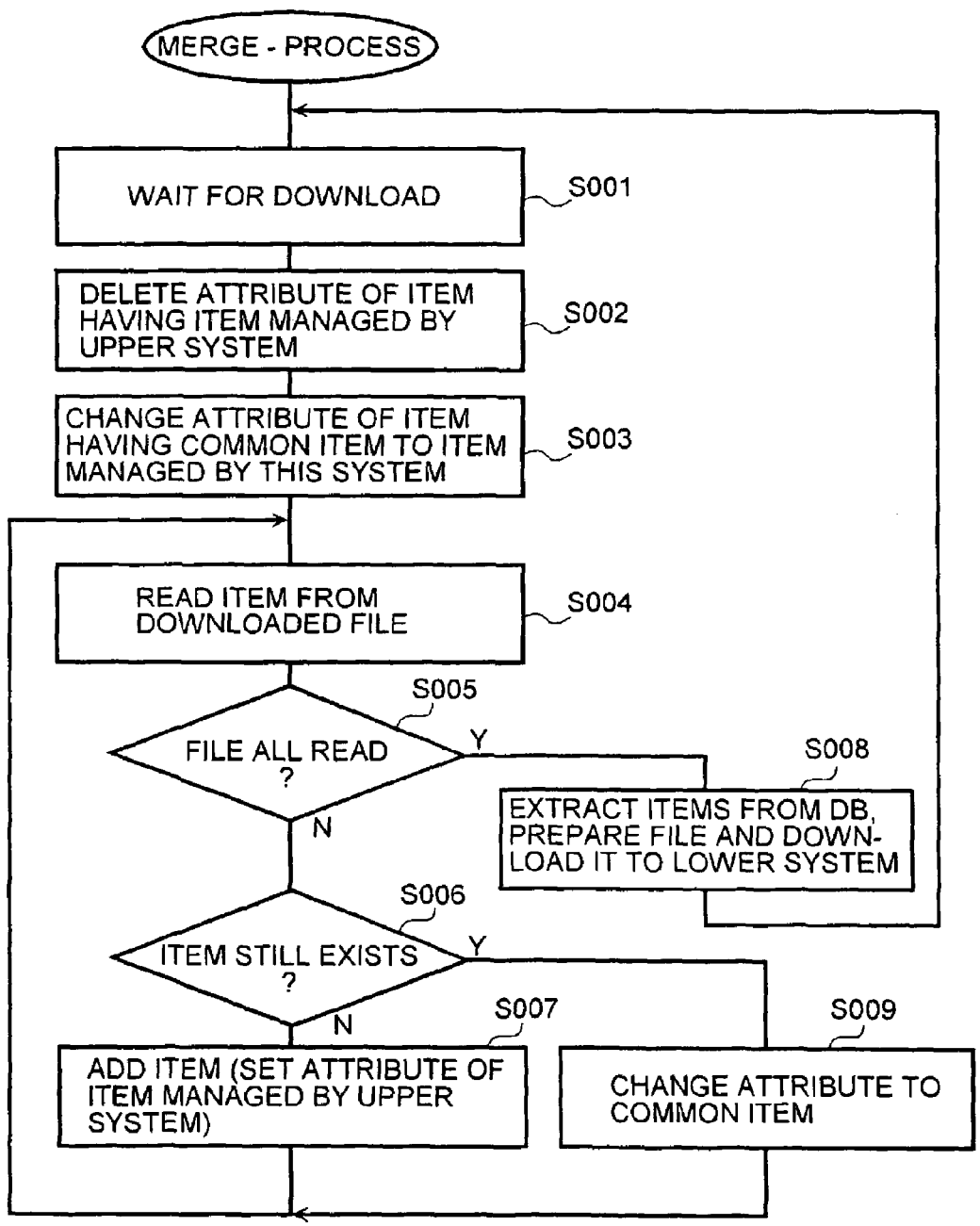
FIG. 15 is a flowchart indicative of the merge processing.

The following describes a merge-process with reference to the transition diagrams shown in FIGS. 12 through 14 and the flowchart shown in FIG. 15. It is assumed that merge-process is performed in a lower manager system shown in the transition diagrams. In the initial state, this manager system is waiting for the downloading of data from the upper manager system or the manager system (S001). At this moment, the items in the DBs of the upper and lower manager systems are as shown in FIG. 12.

It should be noted that, for the convenience of description, the items from the upper manager system have already been prepared in the lower manager system (items A through C and F).

First, when an item file has been downloaded from the upper manager system, this lower manager system deletes all items having the attribute of the item managed by upper system ("1") (S002). Next, this system changes the common item ("0") to the item managed by this system ("0") (S003). The states of the items in the DBs of the upper and lower manager systems are shown in FIG. 13.

Then, this lower manager system opens the downloaded item file (1304) and reads the items (S004). When all items have been read from the item file (S005), this system prepares an item file containing the extracted item data from its own DB and downloads the prepared item file to the directly connected submanager system or managed system (S008) in a lower layer and waits for another downloading operation (S008 to S001).

This submanager system reads the items one by one in the item file (1304) and checks its own DB for the same item (S006). If the same item is found, this system updates its DB by changing the attribute of the same item to the common item ("2") and starts reading the next items (S009 to S004). If there is no same item, this system adds the read items to its DB and sets the attribute of the read item to the item managed by an upper system ("1") and starts reading the next items (S007 to S004).

FIG. 14 shows one example of the DB update operation performed in accordance with the flowchart of merge-process. As shown, item A, item B, and item C are downloaded to this system (lower manager system) from its upper manager system to be merged with item C, item D, and item E held in this system, the result of merge-process being displayed in the after-change table. Then, item C through item B are downloaded to the system in a further lower layer connected to this system.

Figure 16:
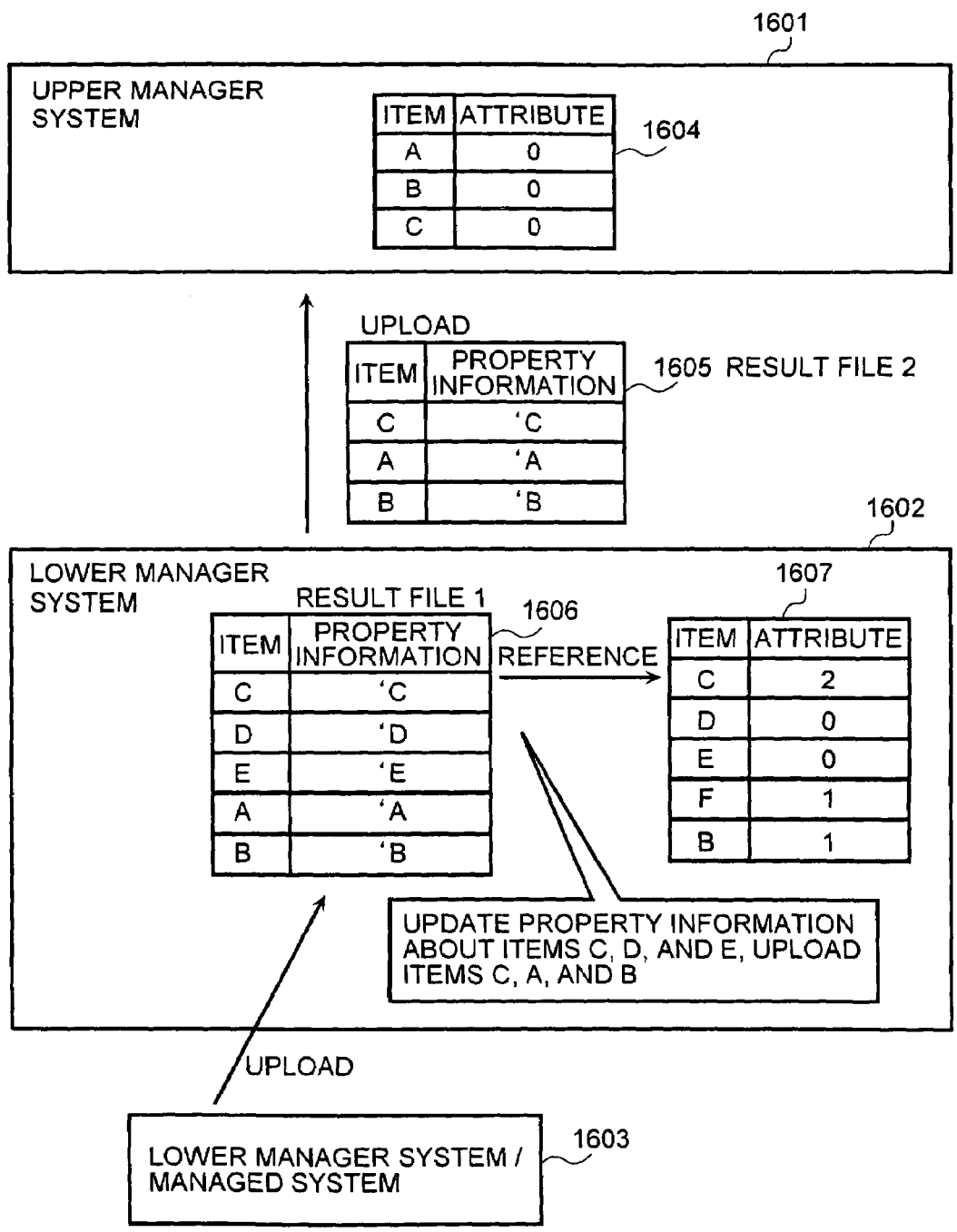
FIG. 16 is a diagram illustrating a state in which property information is updated.
Figure 17:
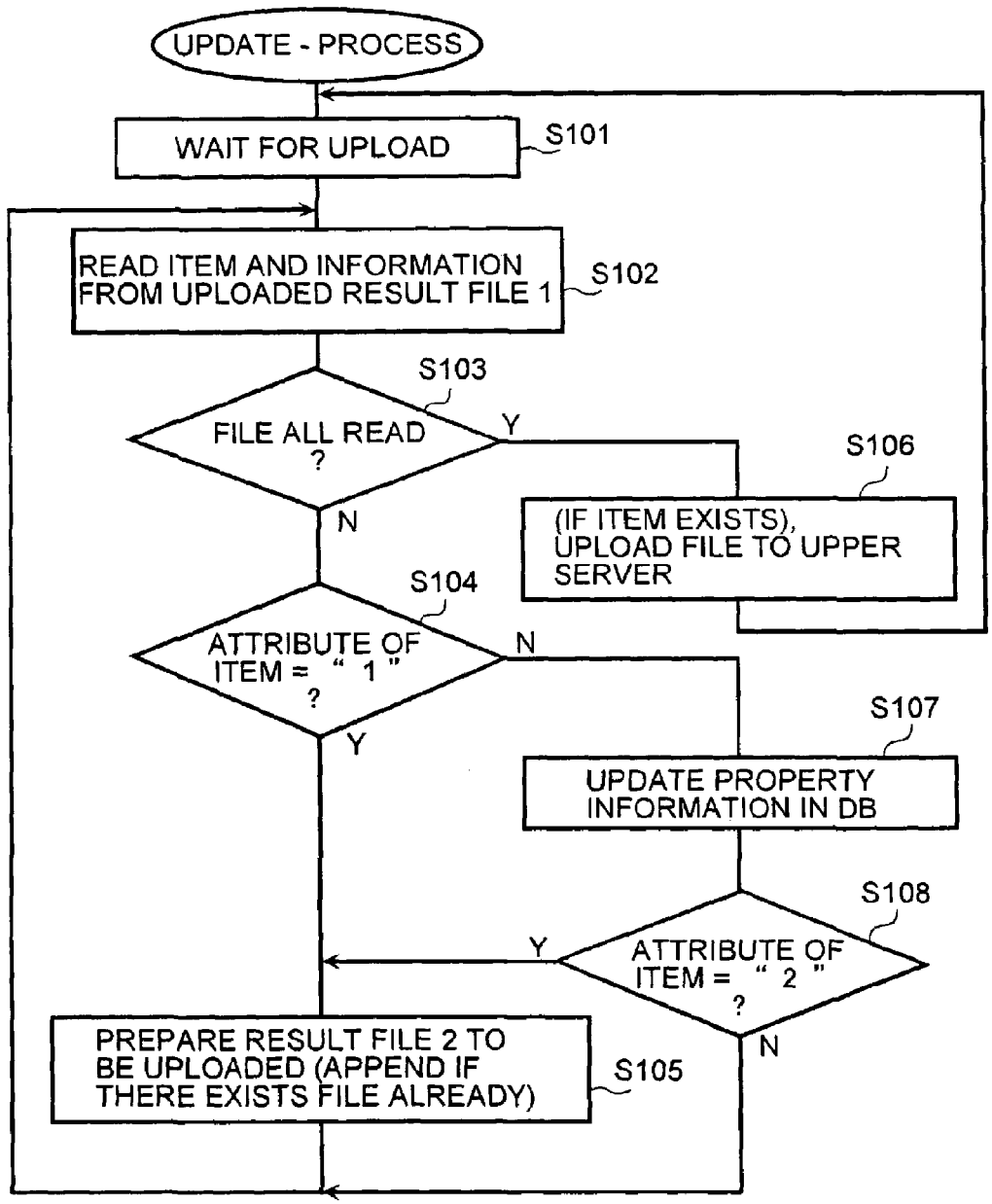
FIG. 17 is a flowchart indicative of the update processing.

The following describes the update-process with reference to the transition diagrams shown in FIGS. 14 and 16 and the flowchart shown in FIG. 17. In the initial state, this system is waiting for the uploading of a result file from its lower-layer system (S101). The state of the items of the DB of this system is as shown in the after-change table shown in FIG. 14. First, this system opens the uploaded result file 1 (1606) and reads the items and property information contained in the file (S102). Next, this system searches its DB for the read item. If the attribute of the detected item is the item managed by an upper system ("1") (S104), then this system writes the item and the property information in the result file 1 to a result file 2 (1605) to upload it to the upper manager system (S105) and starts reading the next item and property information (S102). If the attribute of the detected item is other than the item managed by the upper system ("1") (S104), this system updates the property information of the item concerned in the DB of this system (S107).

If the attribute of the detected item is the common item ("2") (S108), this system writes the item and property information in the result file 1 (1606) to the result file 2 (1605) to upload it to its upper manager system and starts reading the next item and property information (S102). When this system has read all items and property information, it uploads the prepared result file 2 (1605) to the upper manager system (S106) and then waits again for the uploading of the result file 1 (1606) from the lower-layer system (S101).

At this moment, the state of the DB is as shown in FIG. 16. FIG. 16 shows that the property information about item C, item D, and item E of the result file 1 (1606) are reflected on the DB, and item A, item B, and item C have been uploaded to the upper system.

Because the attribute of item C is the common item, it is reflected (updated) on the DB and uploaded to the upper system, thereby preventing the duplication of item C from occurring. Thus, the above-mentioned method prevents data of any same item between the manager system and the managed system from being transferred in a duplicated manner, thereby enhancing the efficiency of the data transfer.

Embodiment 2

The processing to be performed is carried out generally in the same manner as that of the embodiment 1, except for the implementation method and merge-process. Therefore, the following describes mainly Merger-Process with reference to the state transition diagrams shown in FIGS. 18 and 19 and the flowchart shown in FIG. 20. The other processing will be described only for those portions which are different from those of the embodiment 1. Now, referring to FIG. 18, this system attaches an operation flag to each item to be downloaded. To this operation flag indicating the operation status, either "A" indicative of addition or "D" indicative of deletion is set (1805).

The upper manager system stores the information edited in the edit-process of items (processing for storing operation history is added behind each operation processing described in the flowcharts shown in FIGS. 10 and 11) and adds the operation flag to each item in the item file (1805) to be downloaded upon completion of edit-process (only the items manipulated in S304 of FIG. 10 are extracted and item adding processing is performed for the item preparing processing).

Figure 18:
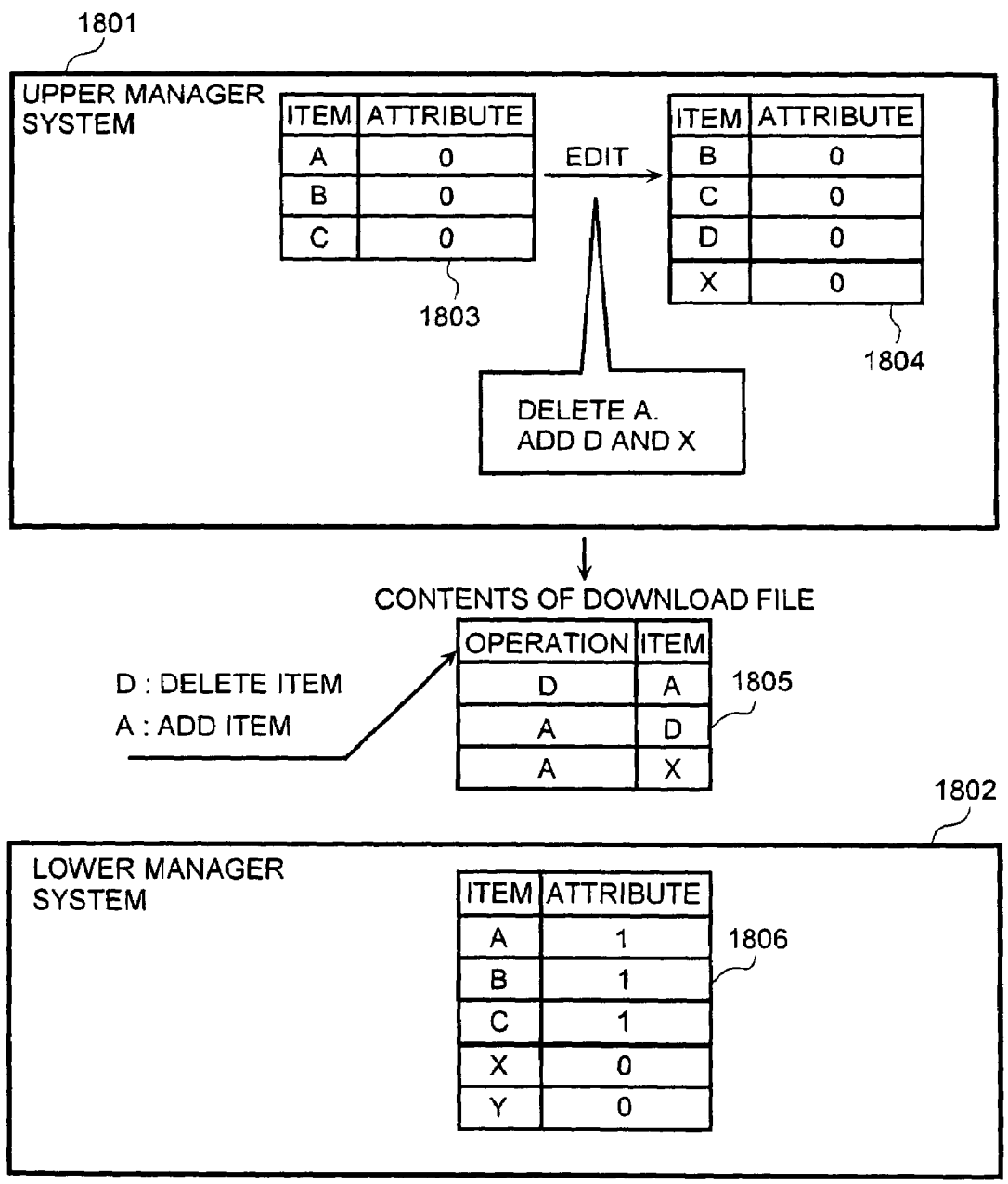
FIG. 18 is a diagram illustrating a state in which items are initialized.

As shown in FIG. 18, if items are added, "A" is attached to item D and item X to be added and "D" is attached to item A to be deleted. First, referring to FIG. 20, when the item file is downloaded from the upper manager system in a download-waiting state (S201), this system reads the operation flag and its item (S202). If the operation flag is deletion ("D") and the attribute of this item is the item managed by the upper system ("1"), this system deletes the item from the DB and reads the next item (S204, S205, S208, A).

If the operation flag is deletion ("D") and the attribute is the common item ("2"), this system changes the attribute from the common item to the item managed by this system ("0") and reads the next item (step S204, S205, S206, S209, A). If the operation flag is addition ("A") and there is no item, this system adds an item to the DB, sets the attributes of this item to the item managed by the upper system ("1"), and reads the next item (S204, S210, S212, A).

If the operation flag is addition ("A") and the attribute of the item existing in this system is an item managed by this system ("0"), this system sets. the attribute of this item to the common item ("2") and reads the next item (S204, S210, S211, S213, A). Then, for the other combinations of statuses than those mentioned above, this system does nothing but reading the next item (A).

Having read all items, this system downloads the item file that was received from the upper manager system to all the submanager systems and managed systems in the lower layer connected thereto without change (S207) and waits for the downloading of another item file from the upper manager system (S207 to C).

Figure 19:
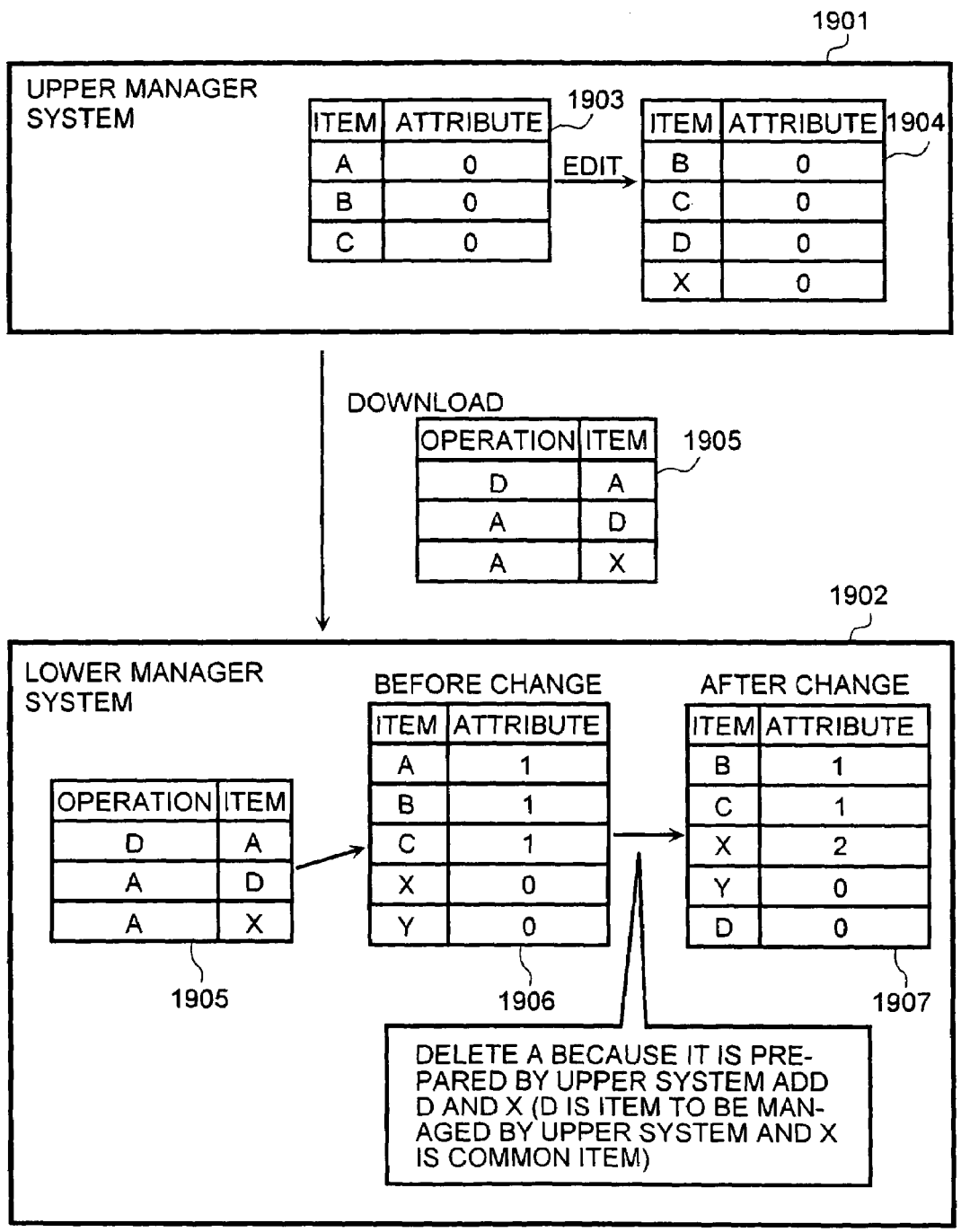
FIG. 19 is a diagram illustrating a state in which items are merged.
Figure 20:
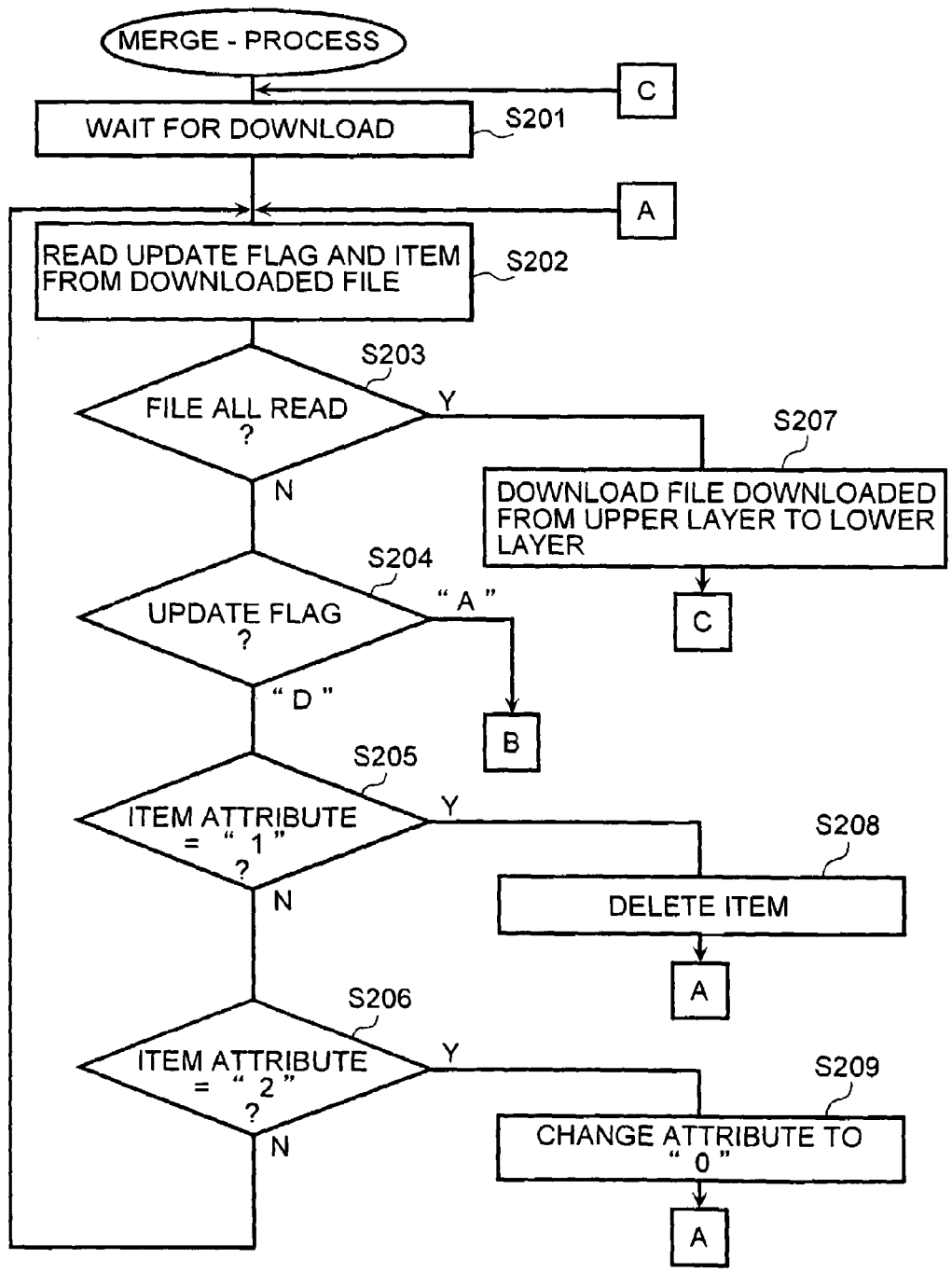
FIGS. 20 and 21 are flowcharts indicative of the merge processing.
Figure 21:
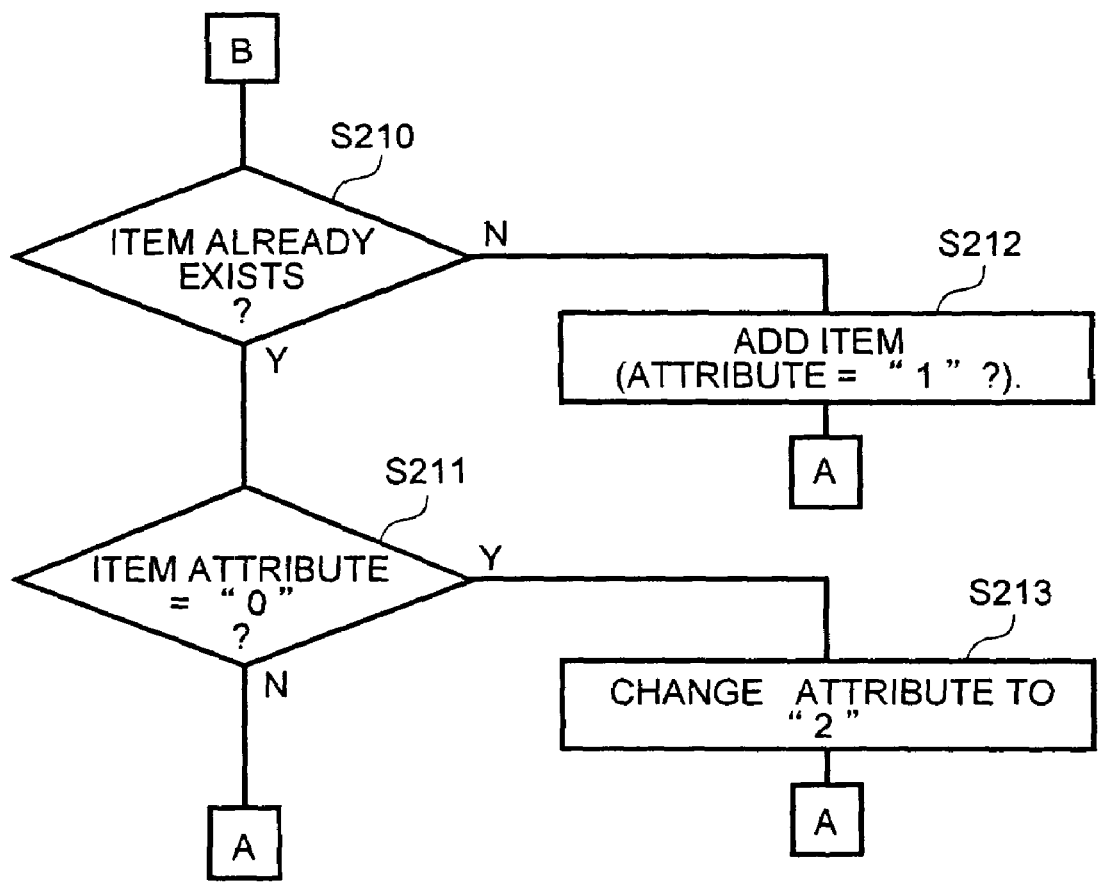

This series of processing operations results in a table whose status is shown in FIG. 19. FIG. 19 shows that item A deleted by the upper manager system and item D and item X added by the upper manager system are downloaded, the downloaded items are merged with the items held in the lower manager system, item D is newly added as the item managed by the upper system, and the attribute of item X is changed to the common item.

Thus, the second embodiment prevents the same item from being transferred in a duplicated manner and requires only a constant size of the item file to be downloaded which is a difference equivalent to the change made to the file.

Embodiment 3

In the embodiment 1 and the embodiment 2, the same items are managed by use of attribute information in each manager system. In the embodiment 3, each manager system has only the items that are managed by this system (on its own) only and has no attribute information, and each of the managed systems holds a requirement system (the program configuration for the embodiment 3 is the same as that of the embodiment 1).

First, the merge-process will be described with reference to the flowchart shown in FIG. 24 and the status transition diagrams shown in FIGS. 22 and 23. It is assumed that the following description is made with reference to the lower manager system shown in these transition diagrams. In the initial state, this system is waiting for the downloading from the upper manager system or the manager system (S401).

Figure 22:
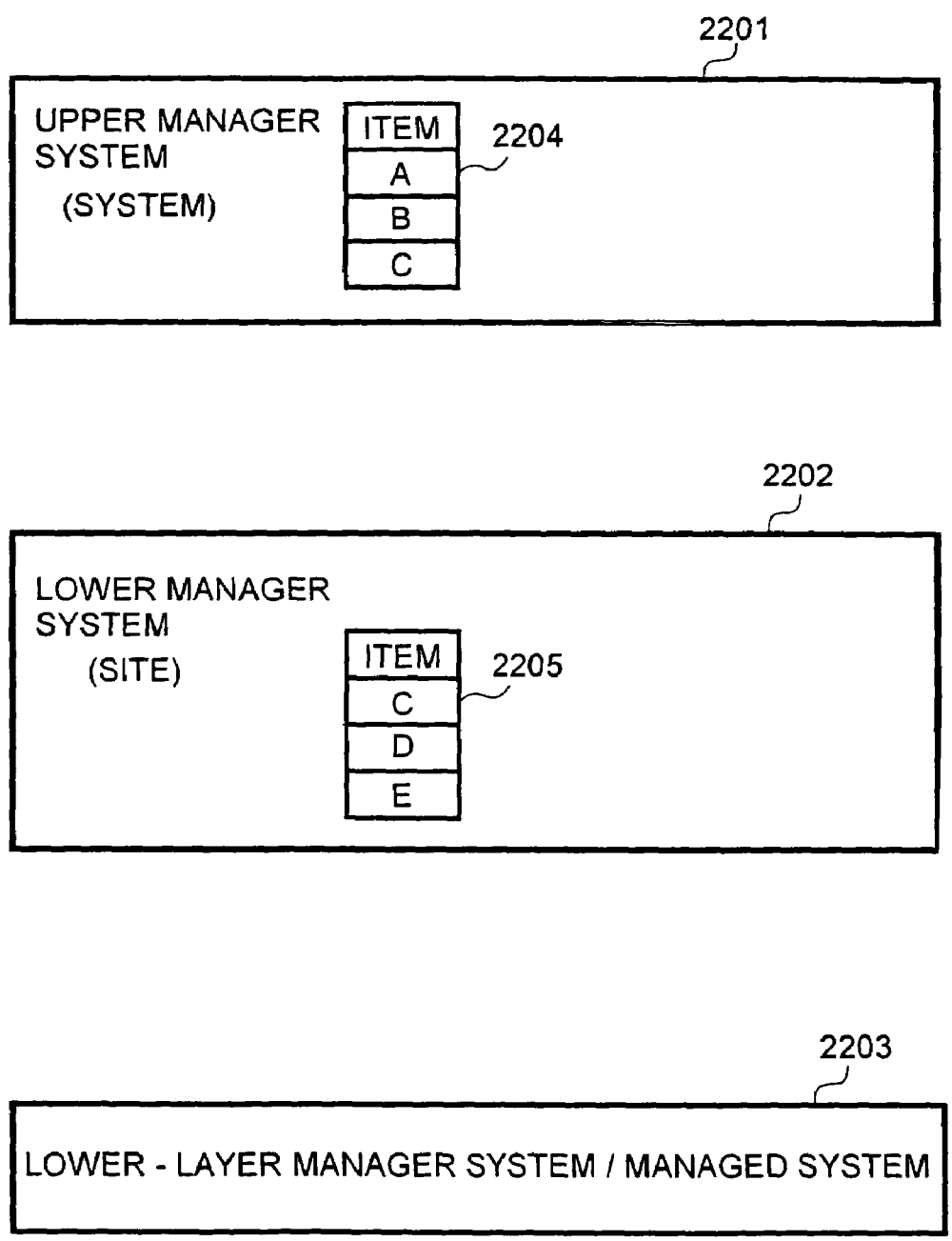
FIG. 22 is a diagram illustrating a state in which items are initialized.

The states of the items in the DB of each manager system are as shown in FIG. 22. For the system names, "SYSTEM" is set to the upper manager system and "SITE" to this lower manager system. The upper system holds items A, B, and C and this system holds items C, D, and E.

Figure 23:
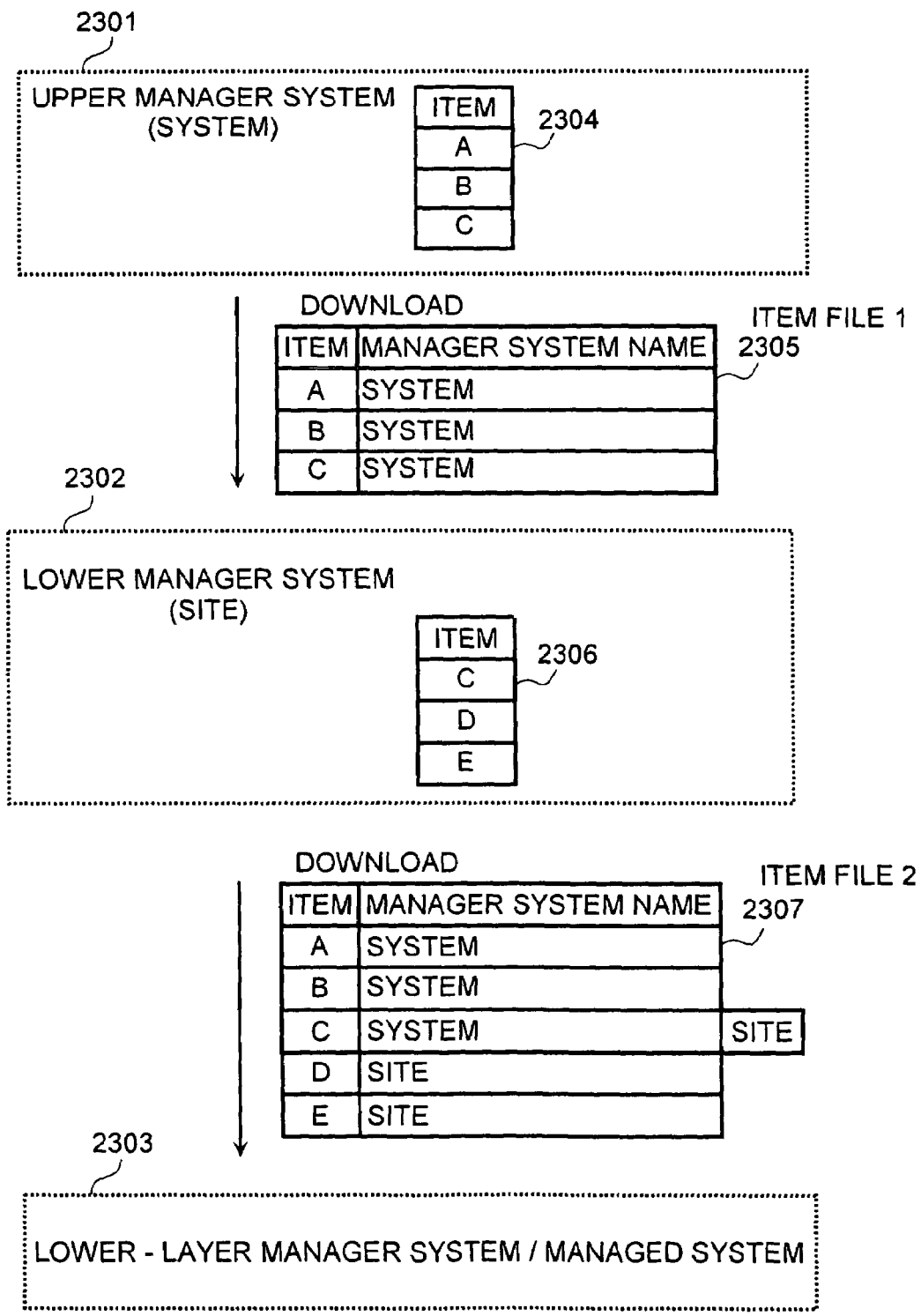
FIG. 23 is a diagram illustrating a state in which items are merged.
Figure 24:
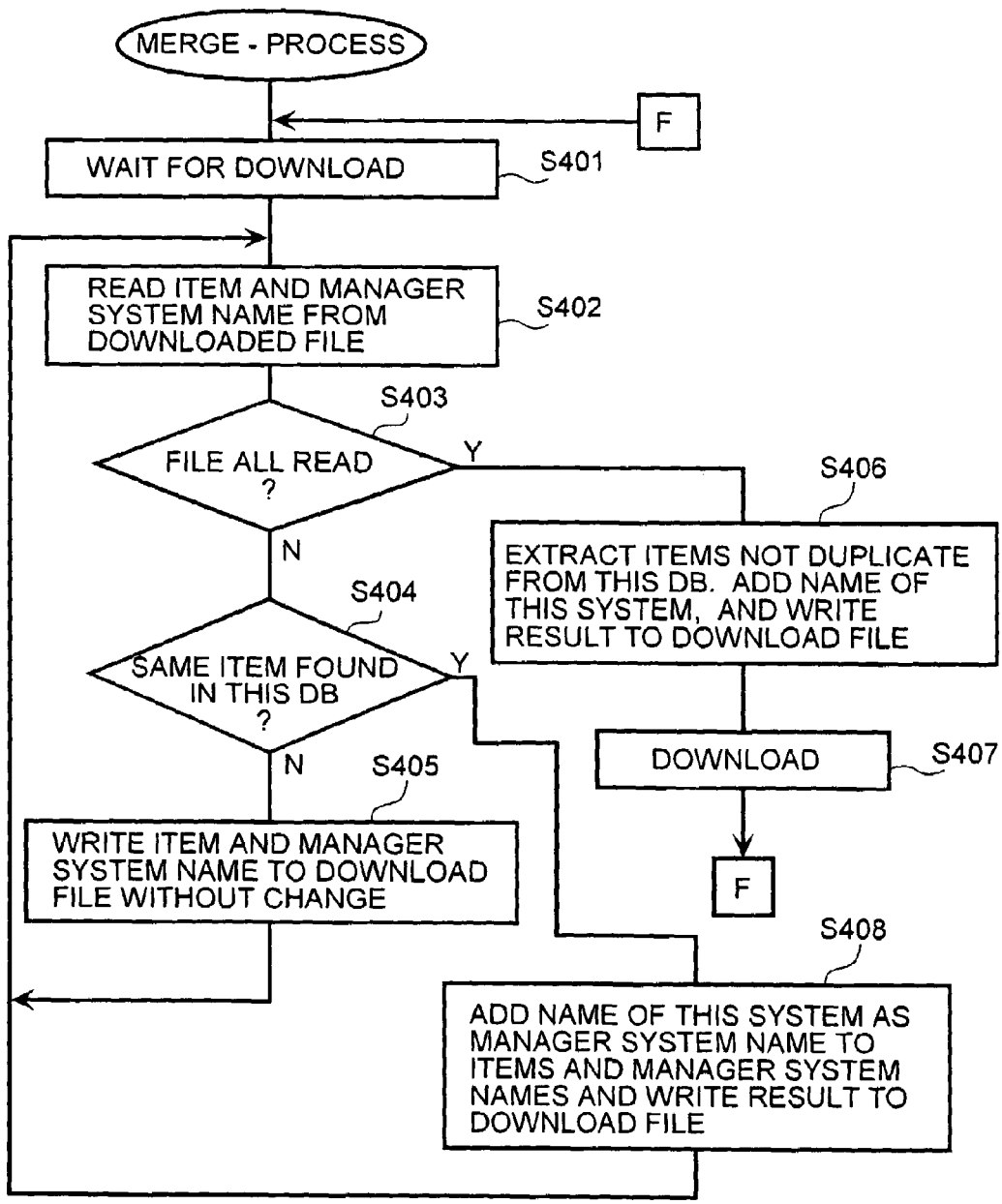
FIG. 24 is a flowchart indicative of the merge processing.

Each item file to be downloaded is composed of items and manager system names for managing these items as shown in FIG. 23. When an item file 1 (2305) has been downloaded from the upper manager system to this system in the download-waiting state (S401), this system reads an item and its manager system name from the downloaded file (S402).

If the read item is found also in the items managed by this system (S404), this system adds the name of this system as a manager system to the duplicating name and its manager system name and writes the result to an item file 2 (2307) to be downloaded to the lower-layer system (S408). If no duplicating item is found, this system writes the items and their manager system names to the item file 2 (2307) without change, to be downloaded to the lower-layer system (S405). Having read all items (S403), this system extracts the items managed by this system that are not duplicates, adds the name of this system to each of these items as the manager system name, writes these items to the item file 2 (2307) to be downloaded to the lower-layer system (S406), downloads the prepared item file 2 (2307) to the lower-layer system (S407), and waits for the downloading of the item file 1 (2305) from the upper manager system (S401).

FIG. 23 shows the downloading of the item files. Because item C is duplicated in both the upper manager system (SYSTEM) and the lower manager system (SITE), system names "SYSTEM" and "SITE" are set as manager system names. Each managed system holds the item file in the form of an item file to be downloaded (in other words, the managed system holds the information about which item is to be returned to which manager system).

When property information has been inputted at the managed system, a result file is prepared in combinations of item, property information, and manager system name. The prepared result file is uploaded to the upper system of the managed system. The following describes the update-process with reference to the flowchart shown in FIG. 26 and the status transition diagram shown in FIG. 25.

In the initial state, this system (SITE) is waiting for the uploading of a result file 1 (2505) (SS01) from the system immediately below. When the result file 1 (2505) has been uploaded, this system opens it and reads the items, property information, and manager system names for one entry (S502).

If the name of this system is included in the manager system names of that entry (S504), this system updates the property information in its DB (S507), deleting the name of this system from the manager system names (S508). If another system name exists in the manager system names (S509), this-system writes the entry with the name of this system removed to a result file 2 (2507) to be uploaded as a result file to its upper manager system (S505).

If the name of this system is not included in the read entry from the beginning, this system does not update the entry and writes the entry as it is to the result file 2 (2507) (S505). Upon reading all entries (S503), this system uploads the prepared result file 2 (2507) to its upper manager system (S506) and waits again until the result file 1 (2505) is uploaded from its lower-layer system (S501).

Figure 25:
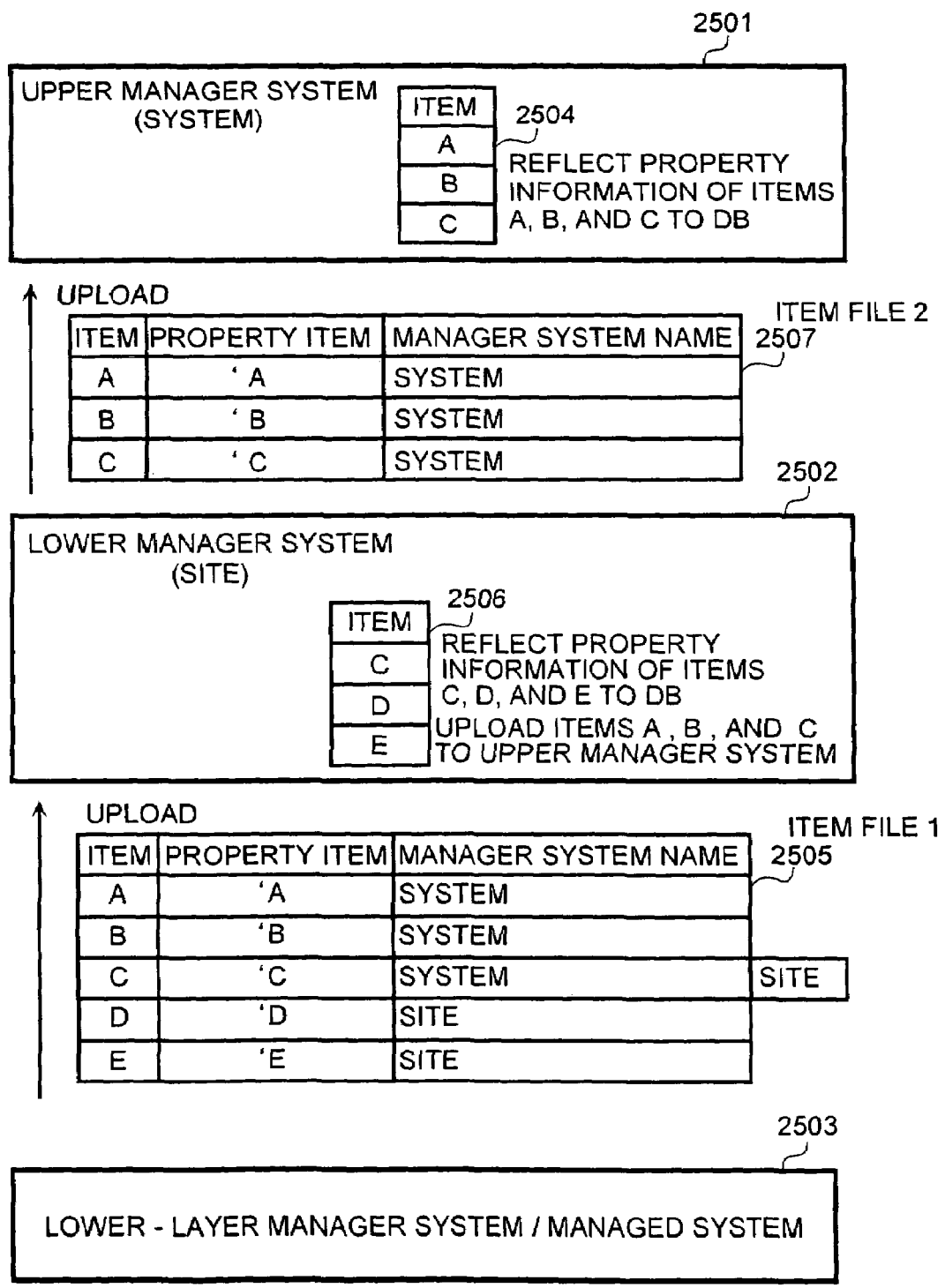
FIG. 25 is a diagram illustrating a state in which property information is updated.
Figure 26:
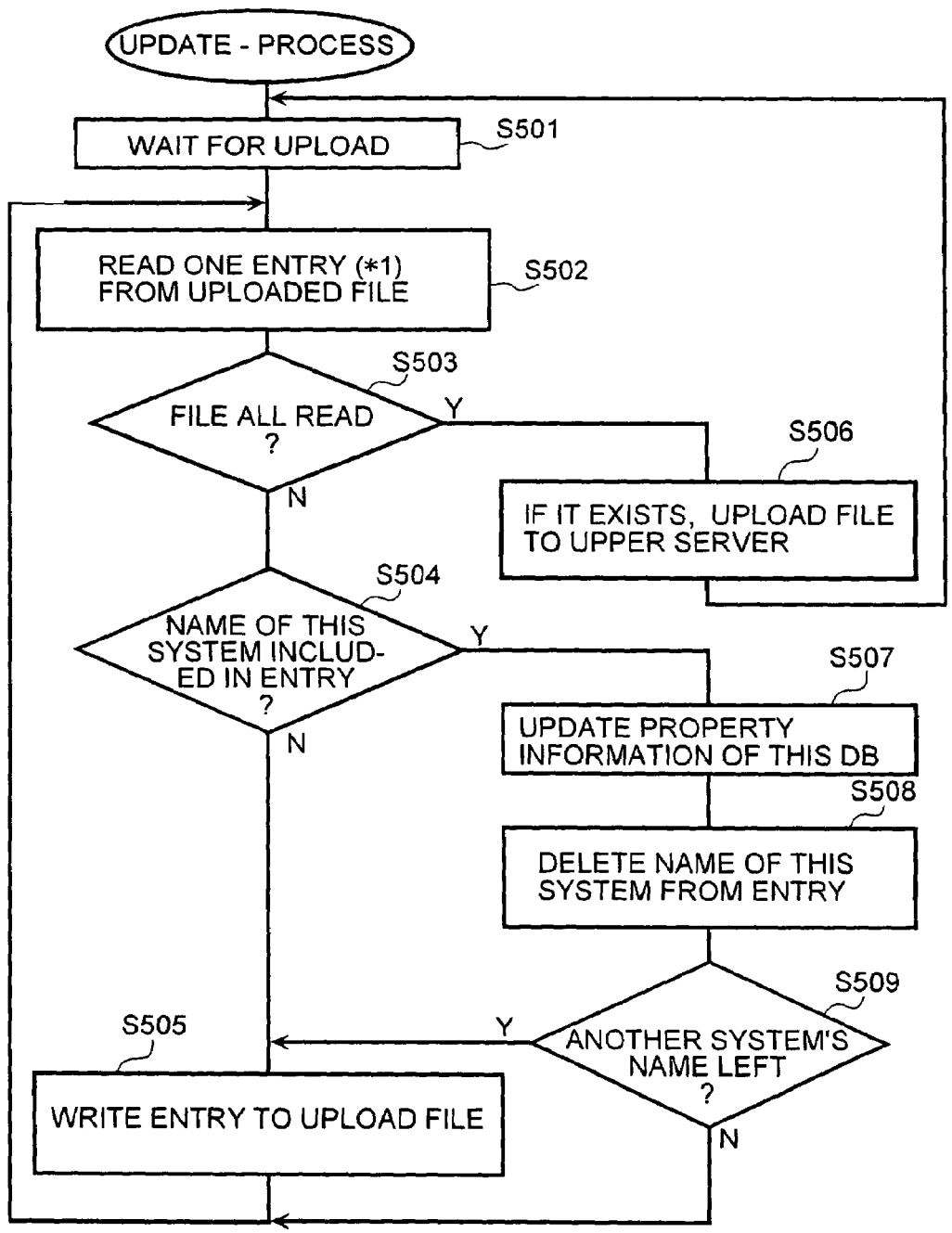
FIG. 26 is a flowchart indicative of the update processing.

FIG. 25 shows the flow of the result files, in which property items A, B, C, D, and E are uploaded as a result from its lower-layer system and this system (SITE) updates its DB with respect to items C, D, and E, uploading the result file containing items A, B, and C to its upper manager system (SYSTEM).

Because item C is common to this system and its upper system, this system updates its DB and uploads the result file, thereby preventing the duplication of item C from occurring. It should be noted that the edit-process is executed only to edit the items of this system and therefore no special processing is executed. For this reason, a description of the edit-process is skipped.

Thus, the embodiment 3 prevents the duplicated transfer of items common to the manager system and the managed system to realize efficient data transmission in a method different from those of the embodiments 1 and 2.

Embodiment 4

This embodiment, in addition to the capabilities of embodiment 1, provides a capability of allowing each submanager system to define in advance default items and their property information. The following describes this method with reference to FIGS. 27 through 29.

Figure 27:
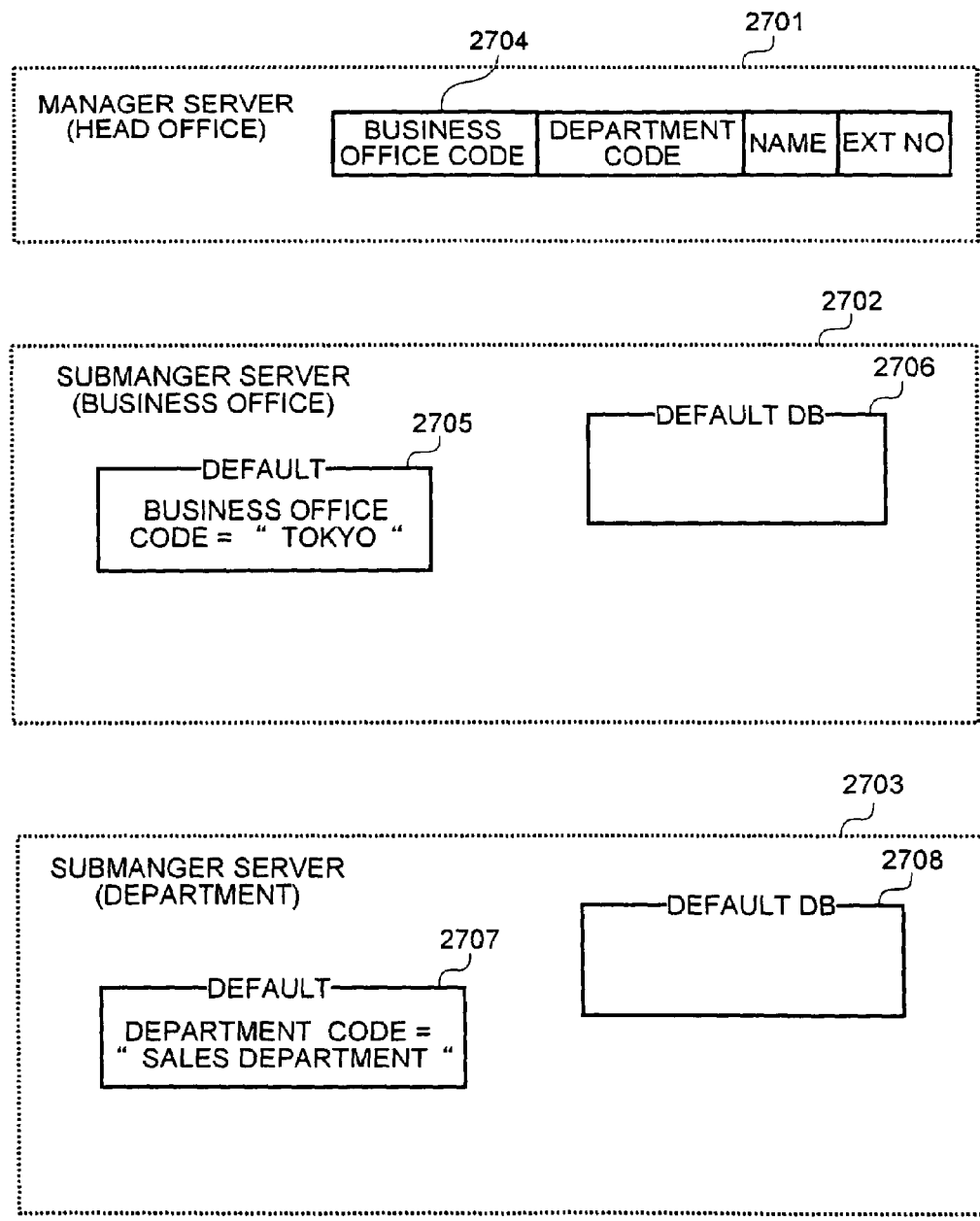
FIG. 27 is a diagram illustrating a state in which items are initialized.

FIG. 27 shows the initial states of the manager system and submanager systems in which the manager system of the head office prepares items "business office code", "department code", "name", "extension number", the submanager system of the business office defines "business office code" and the submanager system of the department defines "department code" as defaults. Addition and deletion of default items can be executed as a part of the edit-process.

Figure 28:
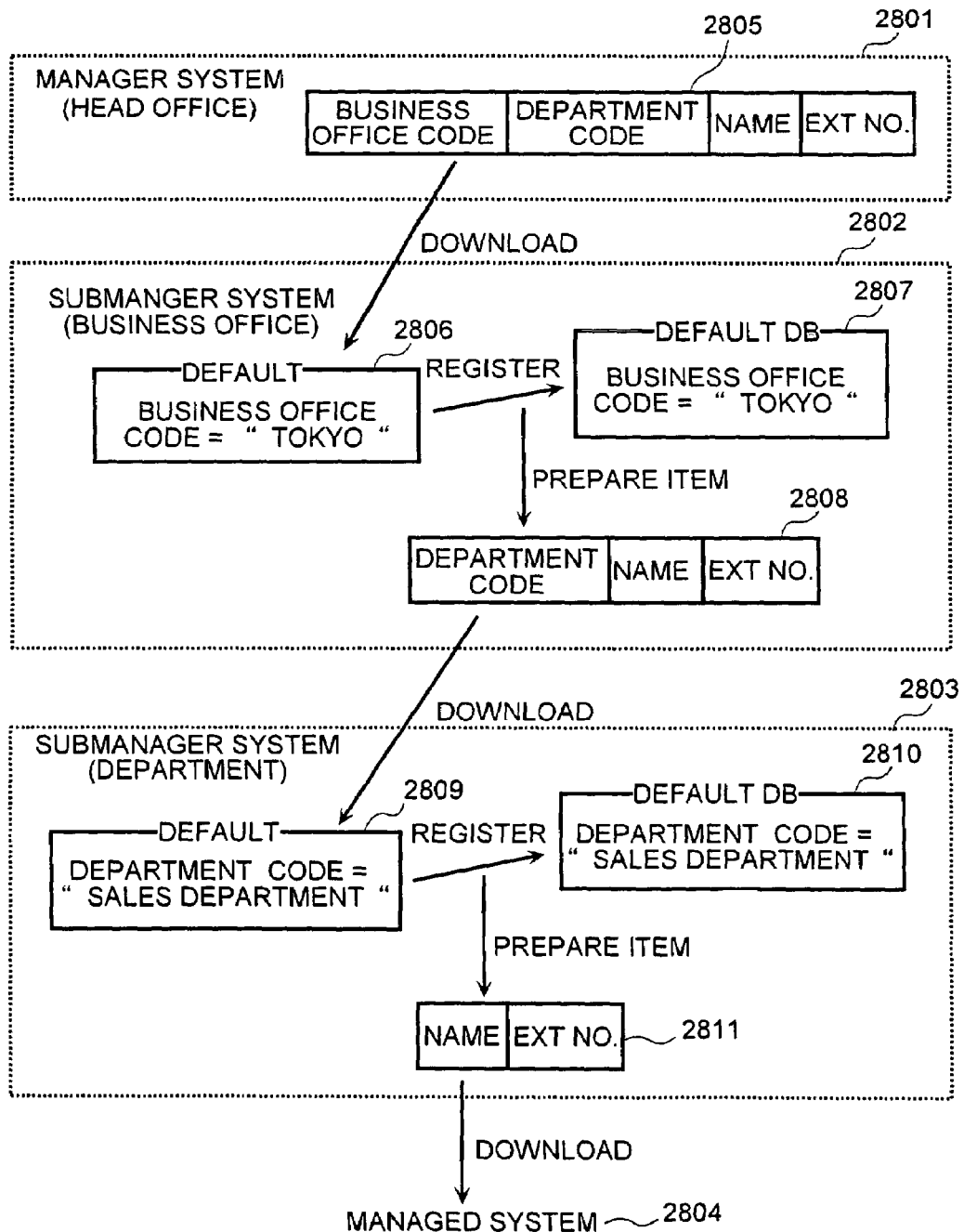
FIG. 28 is a diagram illustrating a state in which items are merged.

FIG. 28 shows a processing flow in which an item file is downloaded to each system. An item file (2805) is downloaded from the manager system of the head office to the submanager system of the business office. The submanager system of the business office compares the item names in the item file with the default item names. If a matching name is found, the submanager system stores the matching item and its property information into the default DB. Then, the submanager system of the business office downloads an item file (2808) composed of "department code," "name", and "extension number" with "business office code" removed therefrom to the submanager system of the department. The submanager system of the department processes "department code" in the same manner and downloads an item file (2811) composed of "name" and "extension number" and sets property information for that item. It should be noted that the items and their property information stored in the default DB are deleted when new items are downloaded from the upper manager system.

Figure 29:
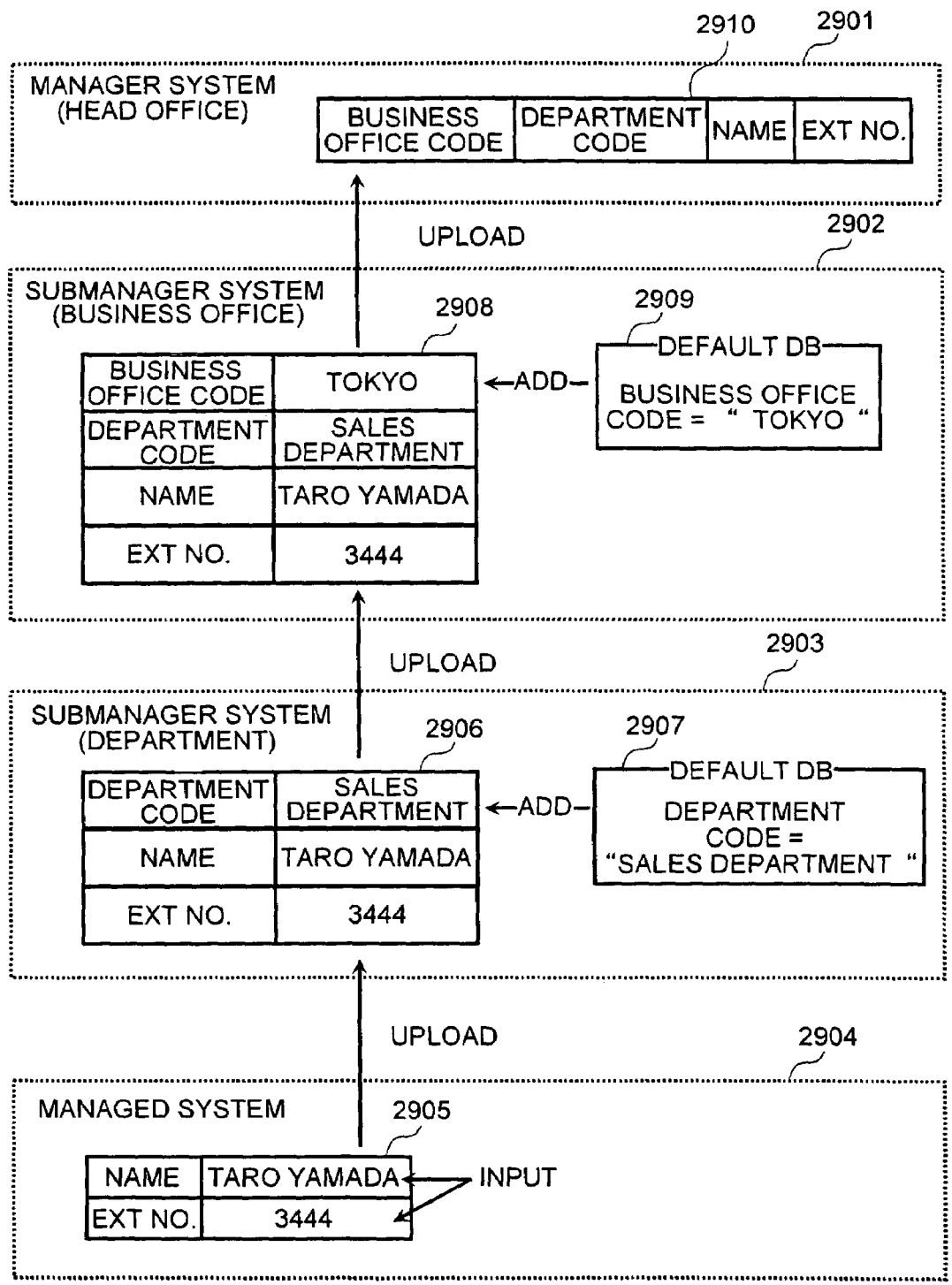
FIG. 29 is a diagram illustrating a state in which property information is updated.

FIG. 29 shows the processing flow in which result files are uploaded. When property information is inputted in the managed system, the managed system uploads a result file to the submanager system of the department. The submanager system of the department adds the item and property information in the default DB to the result file and uploads it to the submanager system of the business office. The submanager system of the business office carries out the same processing as described above, uploading the result file to the manager system of the head office, the result file storing the property information of all items. The current embodiment can be actually implemented by adding particular processing to the processing flow of embodiment 1.

First, in the merge-process, this system adds processing in which the contents of the default DB are all deleted upon downloading of an item file (this processing is added under S003 of FIG. 15). This system checks the downloaded items for an default item. After entering property information of the same time as the default item into the default DB. This system adds processing in which no file is downloaded to the lower-layer system (this processing is added under S005 of FIG. 15). Then, when the information is uploaded in the update-process, this system adds processing in which the items and their default values are additionally written to the result file to be uploaded to the upper manager system (this processing is added so that it is executed when the file has all been read in S103 of FIG. 17). Thus, embodiment 4 can reduce the amount of data transfer by the items defined by default.

Embodiment 5

In embodiment 5, this system determines in the method of embodiment 4 whether there is any default item in the items downloaded by the submanager system to this system. If a default item is found, this system enters the property information of the same item into the default DB. Then, if there is no more item to be downloaded to the manager system or the managed system in the lower layer (if this system has set the default items for all items), this system extracts the items and property information from the default DB, prepares a result file, and uploads it to the upper manager system.

In the actual implementation method, embodiment 5 can be realized by adding particular processing to the flow of embodiment 1 on which the capabilities of embodiment 4 are implemented. In the merge-process, this system determines whether there is any item file which is downloaded to the lower-layer manager system or the managed system. If such an item file is found, this system downloads it. If no such item file is found, this system adds processing in which all contents of the default DB are extracted, a result file is prepared to be uploaded to the upper manager system, and the prepared result file is uploaded to the upper system (this processing is added under S008 of FIG. 15).

The method of embodiment 5 can prevent the data transfer from the submanager system which has completed the input of property information by items defined by default to the managed system.

In addition, this method enhances the efficiency of data transfer over one route of the network in a hierarchical network environment, which in turn achieves efficient data transfer over the entire network.

While the preferred embodiments of the present invention have been described using specific terms, such description is for illustrative purposes only, and it is to be understood that changes and variations may be made without departing from the spirit or scope of the appended claims.

What is claimed is:

1. A method of data transfer in a hierarchical computer system in which a plurality of systems are interconnected in a hierarchical manner, comprising the steps of:
    managing management information including items which are associated with attribute information,
    wherein said attribute information indicates that one of three statuses is set,
    wherein a first status indicates that the items are managed by a current system, a second status indicates that the items are managed by an upper system, and a third status indicates that the items are common to the current system and the upper system, and
    wherein when first data including at least one item is sent from the upper system to a lower system via the current system to request data corresponding to said at least one item:
        receiving, in the current system, the first data including the at least one item from the upper system, the upper system being hierarchically above the current system;
        if said at least one item included in the received first data exists in said items included in a database of the current system, then updating attribute information of said at least one item that exists in said items included in said database of the current system from said attribute information indicative of items managed by the current system to attribute information indicative of items common to the upper system and the current system; and
        if said at least one item included in the received first data does not exist in said items included in said database of the current system, then adding said at least one item that does not exist to said database of the current system, then updating attribute information of said added at least one item to indicate said second status, and sending t he received first data from the current system to a lower system, the current system being hierarchically above the lower system,
    wherein the added at least one item is associated with attribute information indicative of items managed only by the upper system in a database of the upper system,
    wherein when second data including at least one item is sent from the lower system to the upper system via the current system in response to requesting the data corresponding to said at least one item:
        receiving, in the current system, the second data including said at least one item and the data corresponding to said at least one item from the lower system,
        wherein if said at least one item included in the received second data corresponds to said second status or said third status, the current system updates the data corresponding to said at least one item of the second data in the database of the current system, and the received second data is sent from the current system to the upper system, and
        wherein if said at least one item included in the received second data corresponds to said first status, the current system updates the data corresponding to said at least one item of the second data in the database of the current system, and the received second data is not sent from the current system to the upper system.

2. The method of data transfer as claimed in claim 1, wherein if items included in said database of the current system does not exist in said at least one item of the received first data, then modifying said first data by adding items that do not exist in said at least one item of the received first data to said first data; and sending said modified first data to said lower system.

3. The method of data transfer as claimed in claim 1, further comprising the steps of:

receiving at least one of edit requirements for addition or deletion of items; and changing items and attribute information of said items included in said database of the current system according to the edit requirements.

4. A hierarchical computer system comprising:

a plurality of systems which are interconnected in a hierarchical manner, wherein each system manages management information including items which are associated with attribute information, wherein said attribute information indicates that one of three statuses is set, wherein a first status indicates that the items are managed by a current system, a second status indicates that the items are managed by an upper system, and a third status indicates that the items are common to the current system and the upper system, and wherein when first data including at least one item is sent from the upper system to a lower system via the current system to request data corresponding to said at least one item:

said current system, upon receipt of the first data including the at least one item from the upper system, determines whether said at least one item exists in said items included in a database of said current system, the upper system being hierarchically above said current system, if said at least one item included in the received first data exists in said items included in said database of said current system, then attribute information of said at least one item that exists in said items included in said database of said current system is updated from said attribute information indicative of items managed by said current system to attribute information indicative of items common to the upper system and said current system, and if said at least one item included in the received first data does not exist in said items included in said database of said current system, then said at least one item that does not exist is added to said database of said current system, then attribute information of said added at least one item is undated to indicate said second status, and the received first data is sent from said current system to said lower system, said current system being hierarchically above the lower system, wherein the added at least one item is associated with attribute information indicative of items managed only by the upper system in a database of said upper system, wherein when second data including at least one item is sent from the lower system to the upper system via the current system in response to requesting the data corresponding to said at least one item:

receiving, in the current system, the second data including said at least one item and the data corresponding to said at least one item from the lower system, wherein if said at least one item included in the received second data corresponds to said second status or said third status, the current system updates the data corresponding to said at least one item of the second data in the database of the current system, and the received second data is sent from the current system to the upper system, and wherein if said at least one item included in the received second data corresponds to said first status, the current system updates the data corresponding to said at least one item of the second data in the database of the current system, and the received second data is not sent from the current system to the upper system.

5. The hierarchical computer system as claimed in claim 4, wherein if items included in said database of said current system does not exist in said at least one item of the received first data, then modifying said first data by adding items that do not exist in said at least one item of the received first data to said first data; and sending said modified first data to said lower system.

6. The hierarchical computer system as claimed in claim 4, wherein said current system, upon receipt of at least one of edit requirements for addition or deletion of items, changing items and attribute information of said items included in said database of said current system according to the edit requirements.

7. A computer program, stored on a computer readable storage medium, for implementing data transfer in a hierarchical computer system in which a plurality of systems are interconnected in a hierarchical manner, said computer program when executed causes the hierarchical computer system to perform the steps of:

managing management information including items which are associated with attribute information, wherein said attribute information indicates that one of three statuses is set, wherein a first status indicates that the items are managed by a current system, a second status indicates that the items are managed by an upper system, and a third status indicates that the items are common to the current system and the upper system, and wherein when first data including at least one item is sent from the upper system to a lower system via the current system to request data corresponding to said at least one item:

receiving, in the current system, the first data including the at least one item from the upper system, the upper system being hierarchically above the current system;

if said at least one item included in the received first data exists in said items included in a database of the current system, then updating attribute information of said at least one item that exists in said items included in said database of the current system from said attribute information indicative of items managed by the current system to attribute information indicative of items common to the upper system and the current system; and if said at least one item included in the received first data does not exist in said items included in said database of the current system, then adding said at least one item that does not exist to said database of the current system, then updating attribute information of said added at least one item to indicate said second status, and sending said first data to a lower system, the current system being hierarchically above the lower system, wherein the added at least one item is associated with attribute information indicative of items managed only by the upper system in a database of the upper system, wherein when second data including at least one item is sent from the lower system to the upper system via the current system in response to requesting the data corresponding to said at least one item:

receiving, in the current system, the second data including said at least one item and the data corresponding to said at least one item from the lower system, wherein if said at least one item included in the received second data corresponds to said second status or said third status, the current system updates the data corresponding to said at least one item of the second data in the database of the current system, and the received second data is sent from the current system to the upper system, and wherein if said at least one item included in the received second data corresponds to said first status, the current system updates the data corresponding to said at least one item of the second data in the database of the current system, and the received second data is not sent from the current system to the upper system.

8. The computer program as claimed in claim 7, wherein if items included in said database of the current system do not exist in said at least one item of the received first data, then modifying said first data by adding items that do not exist in said at least one item of the received first data to said first data; and sending said modified first data to said lower system.

9. The computer program as claimed in claim 7, wherein said computer program when executed causes the hierarchical computer system to further perform the steps of:

receiving at least one of edit requirements for addition or deletion of items; and changing items and attribute information of said items included in said database of the current system according to the edit requirements.

* * * * *